Jan. 15, 1963 J. A. YERKES 3,073,199
VARIABLE HOLE PATTERN HAND PUNCH
Filed April 16, 1962 9 Sheets-Sheet 1

INVENTOR
JOHN A. YERKES
BY
Robertson & Smythe
ATTORNEYS

Jan. 15, 1963 J. A. YERKES 3,073,199
VARIABLE HOLE PATTERN HAND PUNCH
Filed April 16, 1962 9 Sheets-Sheet 2
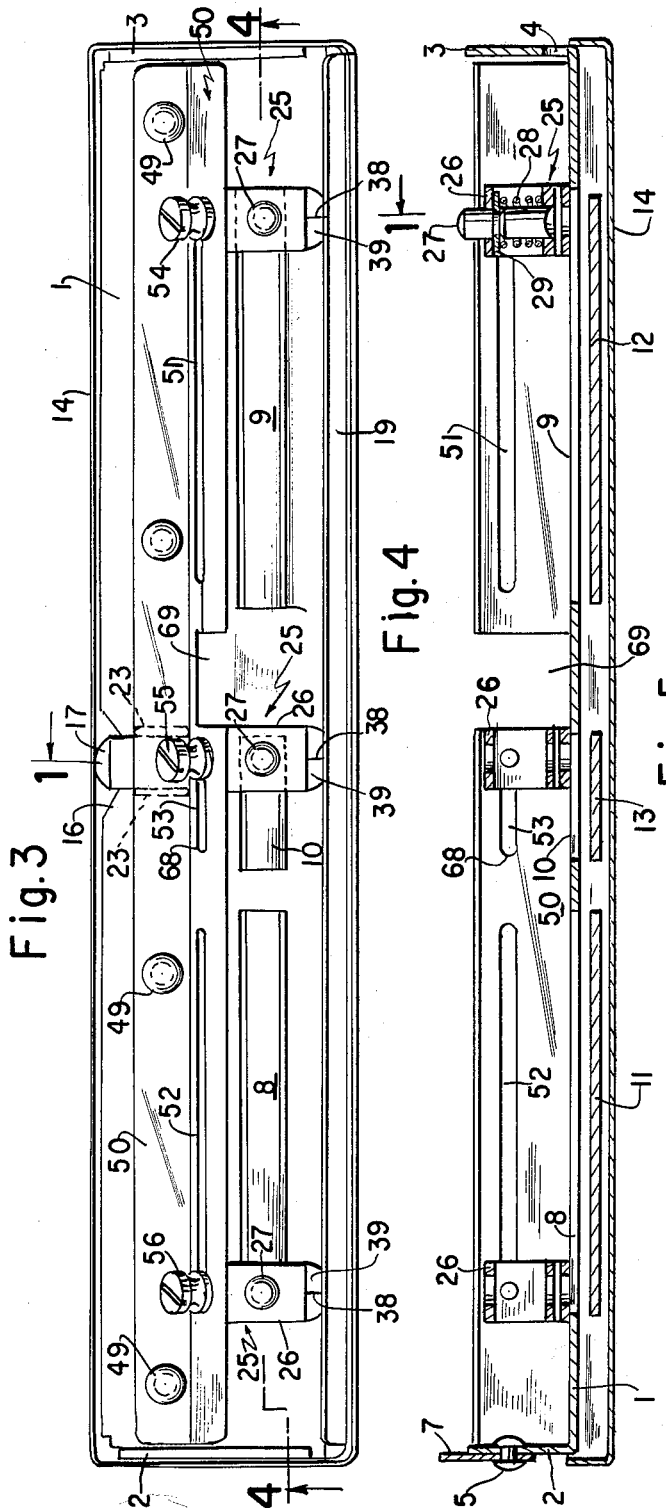
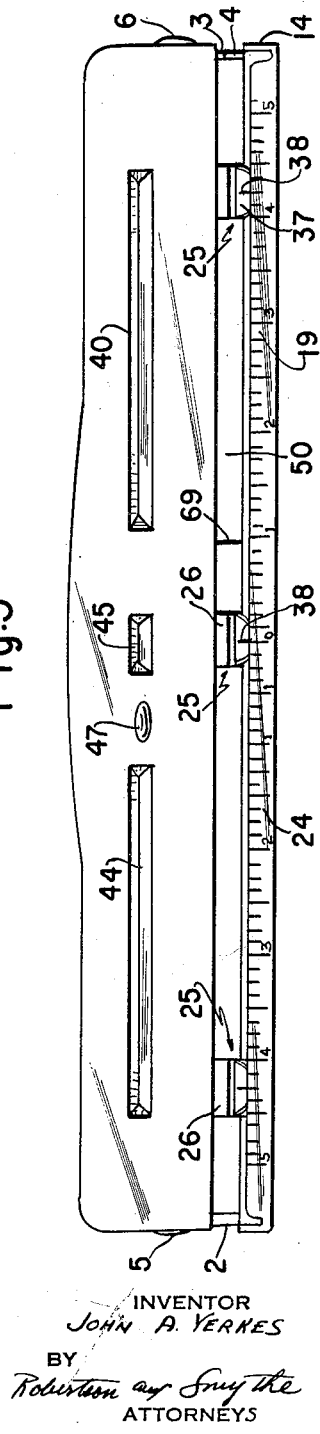
INVENTOR
JOHN A. YERKES
BY
Robertson and Smythe
ATTORNEYS Jan. 15, 1963 J. A. YERKES 3,073,199
VARIABLE HOLE PATTERN HAND PUNCH
Filed April 16, 1962 9 Sheets-Sheet 3
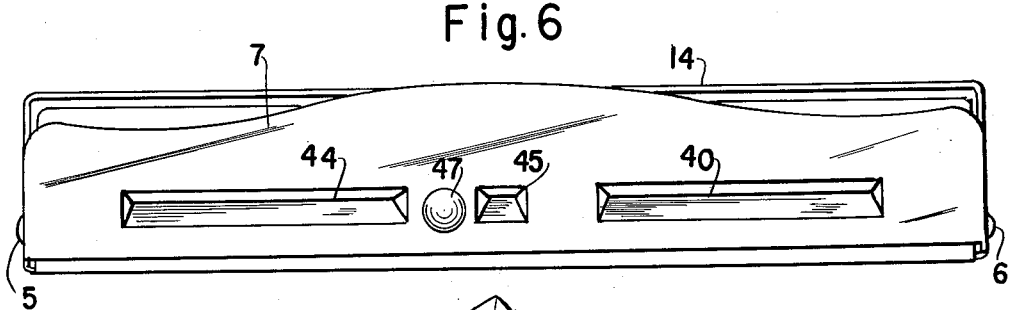
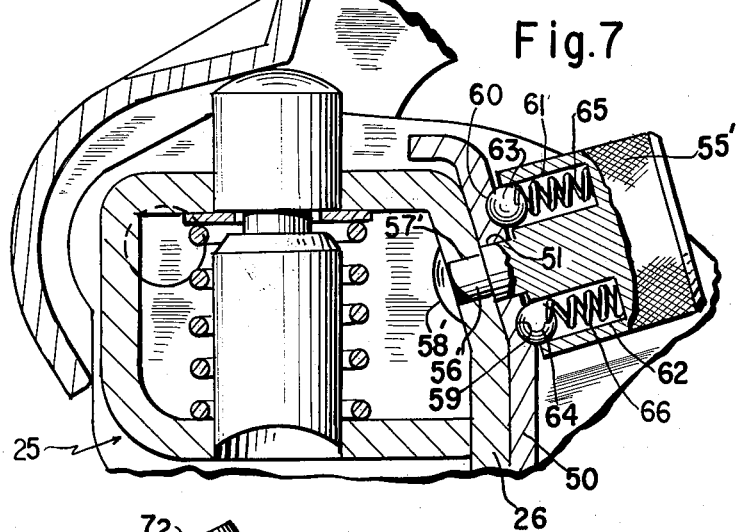
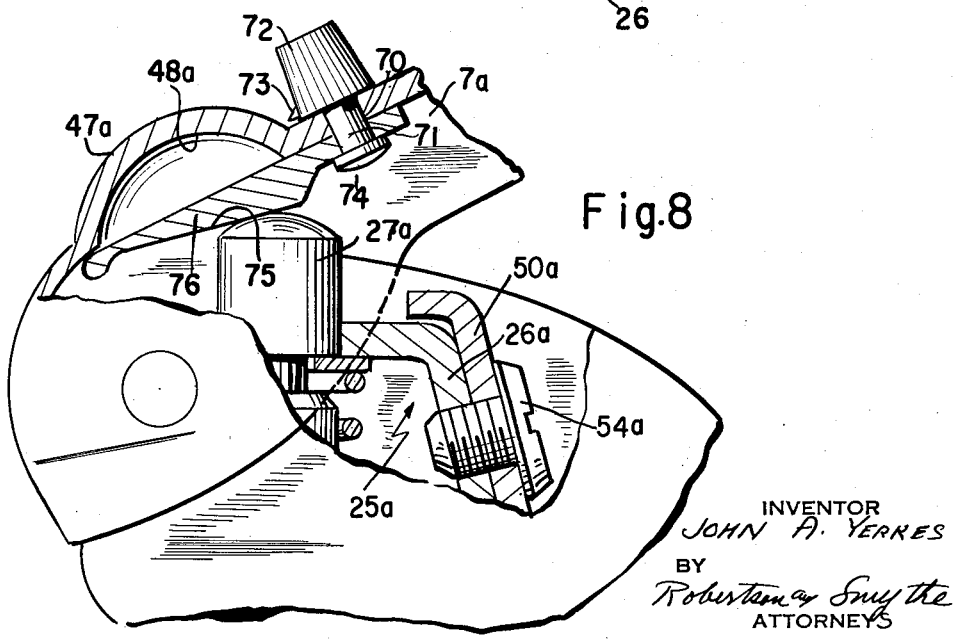
INVENTOR
JOHN A. YERKES
BY
Robertson & Smythe
ATTORNEYS Jan. 15, 1963     J. A. YERKES     3,073,199
VARIABLE HOLE PATTERN HAND PUNCH
Filed April 16, 1962     9 Sheets-Sheet 4
Fig. 9
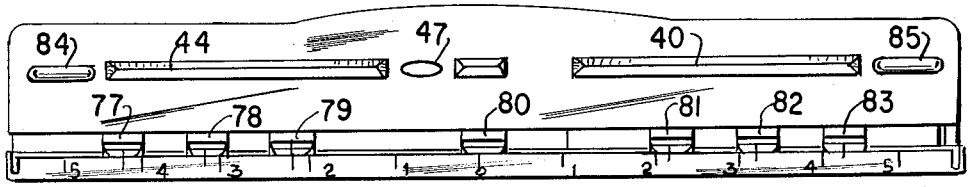
Fig. 10
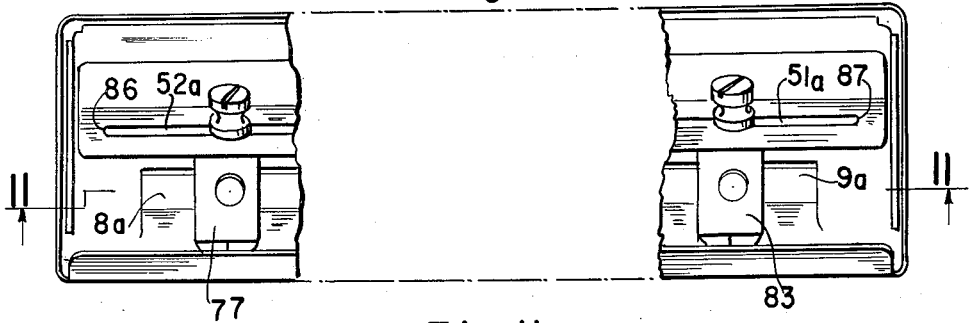
Fig. 11
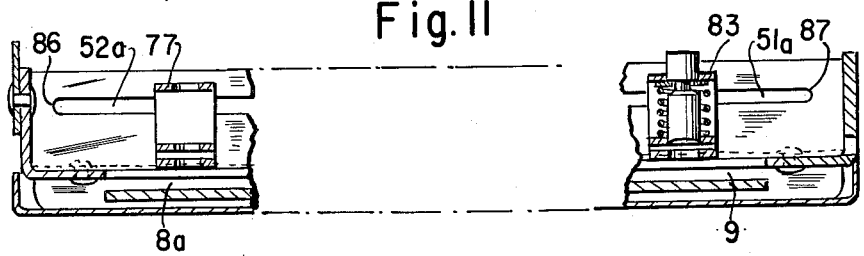
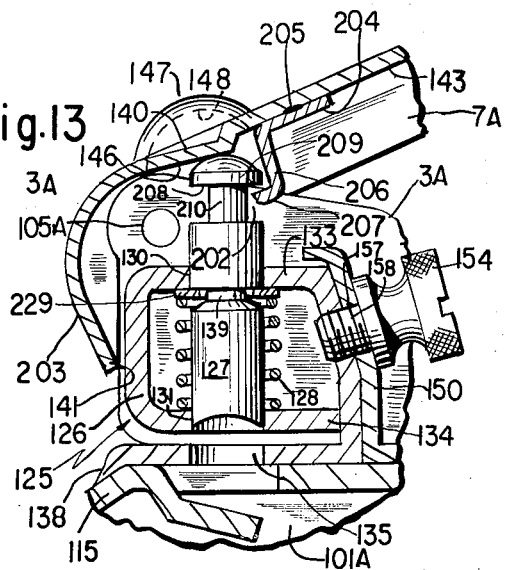
Fig. 13
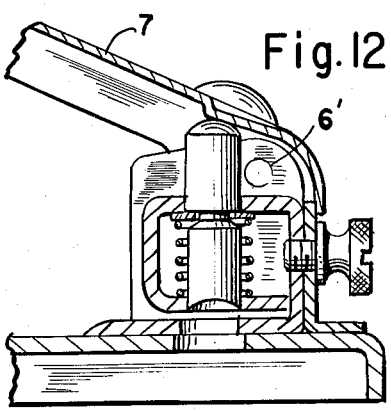
Fig. 12
INVENTOR
JOHN A. YERKES
BY
Robertson and Smythe
ATTORNEYS Jan. 15, 1963　　　J. A. YERKES　　　3,073,199
VARIABLE HOLE PATTERN HAND PUNCH
Filed April 16, 1962　　　　　　　　　　　　　9 Sheets-Sheet 5
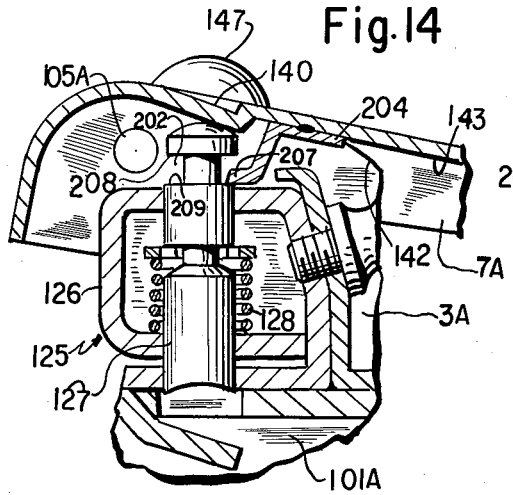
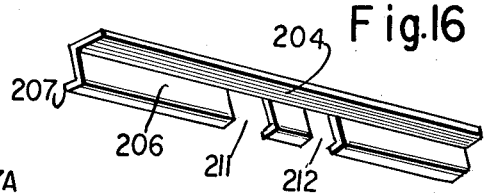
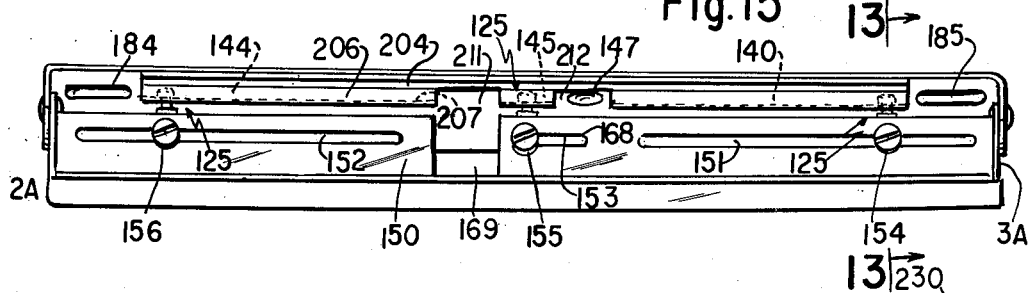
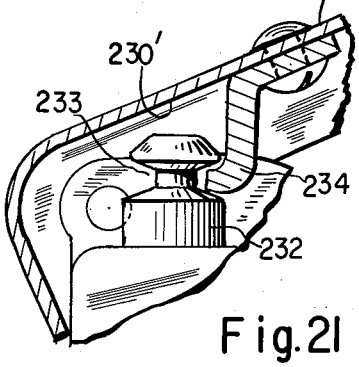
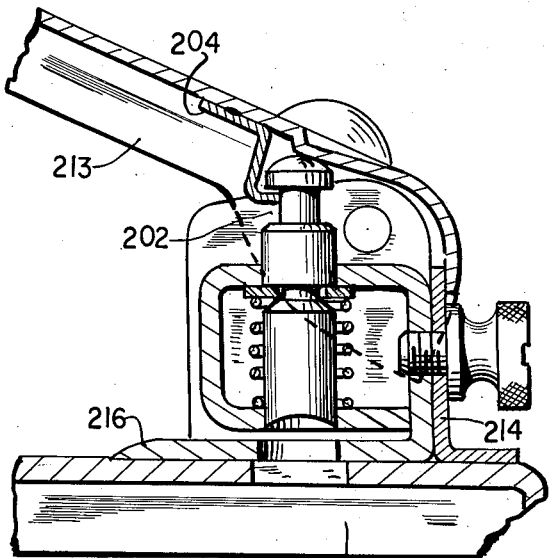
INVENTOR
JOHN A. YERKES
BY
Robertson and Smythe
ATTORNEYS Jan. 15, 1963

J. A. YERKES 3,073,199

VARIABLE HOLE PATTERN HAND PUNCH

Filed April 16, 1962

INVENTOR
JOHN A. YERKES
BY
Robertson ay Smythe
ATTORNEYS

Jan. 15, 1963
J. A. YERKES
3,073,199
VARIABLE HOLE PATTERN HAND PUNCH
Filed April 16, 1962
9 Sheets-Sheet 7
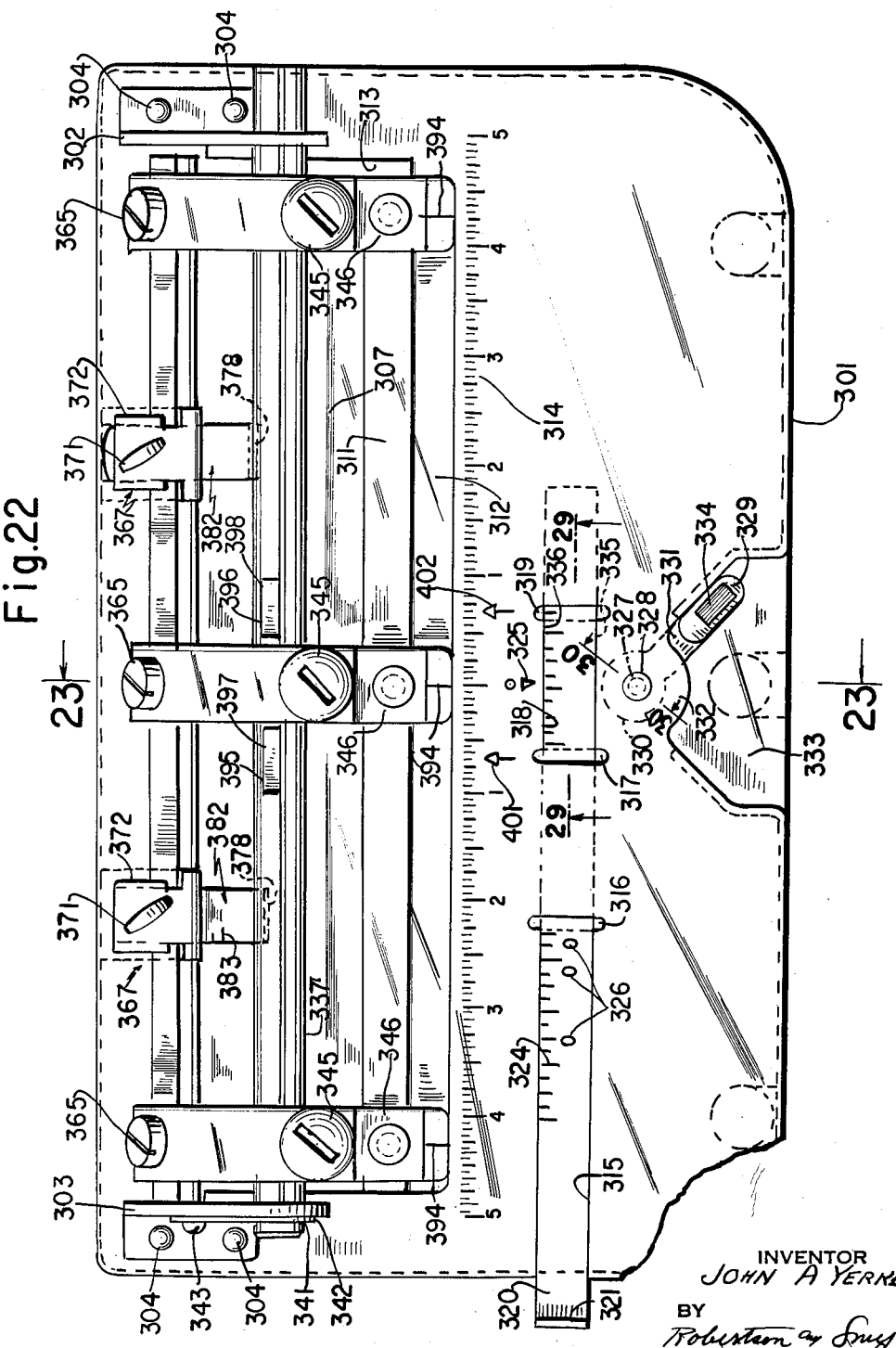
INVENTOR
JOHN A. YERKES
BY
Robertson and Smythe
ATTORNEYS

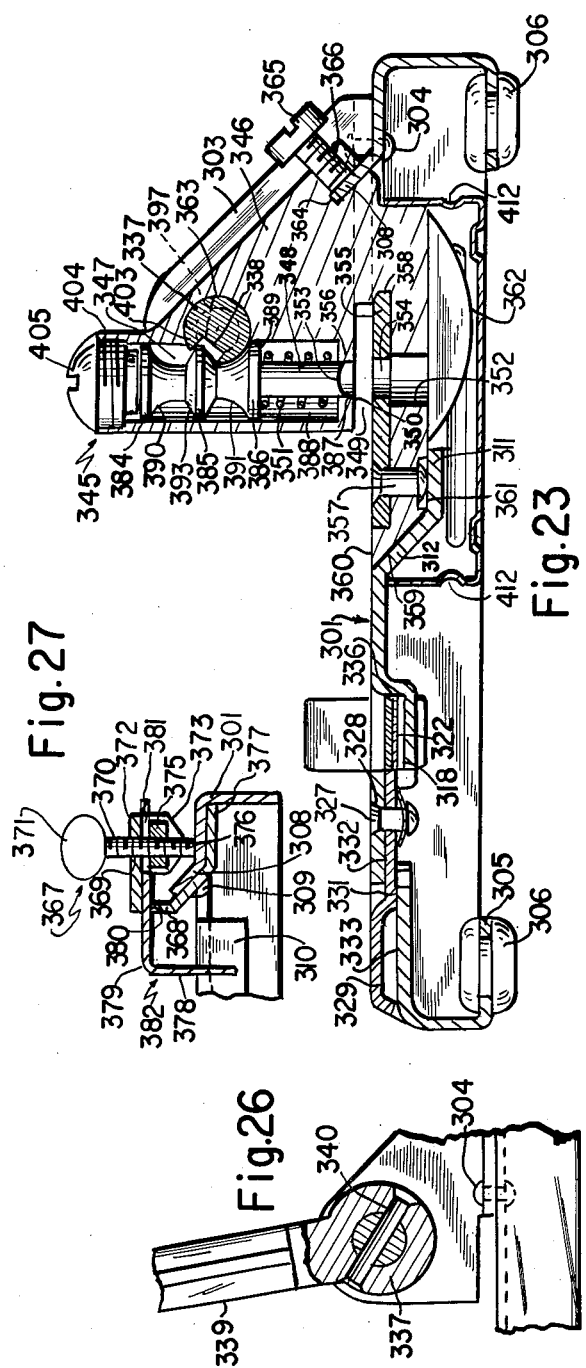
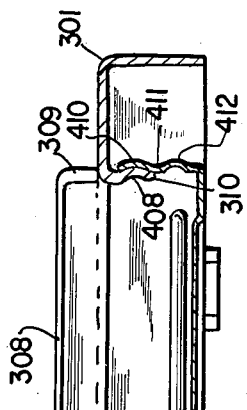
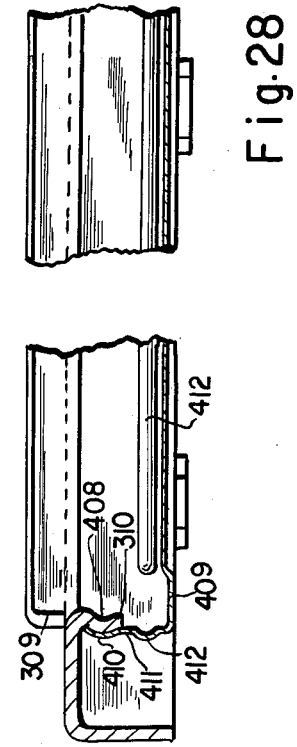
Jan. 15, 1963  J. A. YERKES  3,073,199
VARIABLE HOLE PATTERN HAND PUNCH
Filed April 16, 1962  9 Sheets-Sheet 8
Fig. 23
Fig. 27
Fig. 26
Fig. 28
INVENTOR
JOHN A. YERKES
BY
Robertson & Smythe
ATTORNEYS

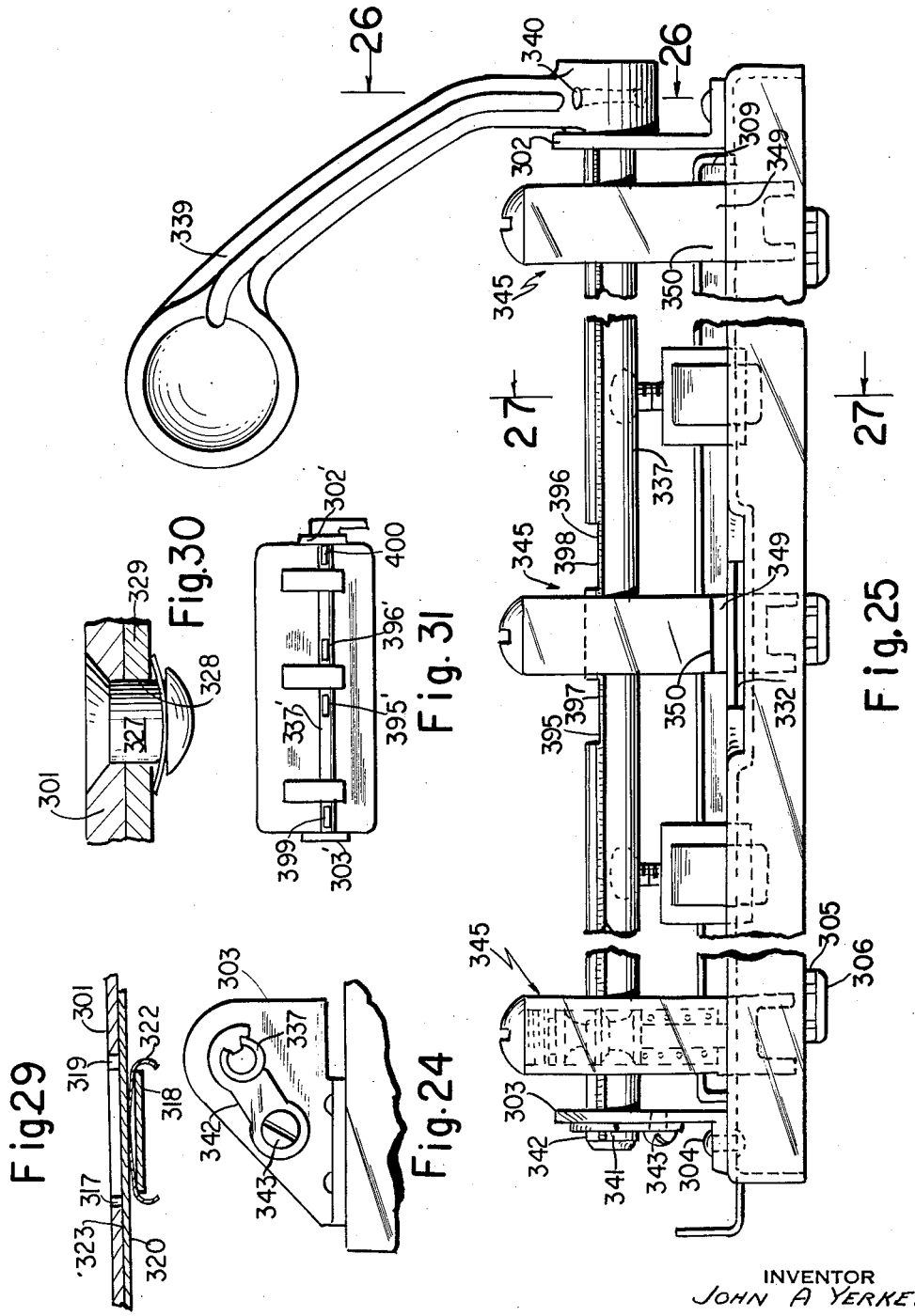

United States Patent Office 3,073,199
Patented Jan. 15, 1963

3,073,199
VARIABLE HOLE PATTERN HAND PUNCH
John A. Yerkes, New York, N.Y.
Filed Apr. 16, 1962, Ser. No. 187,762
19 Claims. (Cl. 83—549)

This invention relates to perforators of the type capable of perforating various combinations of holes in sheet materials, with various spacings between said holes. Paper sheets, for example, may be perforated in selected patterns to fit various types of ring binders, pin files and the like.

This invention is a continuation-in-part of application Serial No. 684,478, filed September 17, 1957, now abandoned and includes the subject matter of applicant's co-pending application Serial No. 684,605, now abandoned and application Serial No. 684,593, now abandoned, both filed September 17, 1957.

Adjustable perforators for varying the hole patterns are well known in the art. One type is shown in my United States Patents 2,524,583 and 2,534,094. In that type, the reciprocable punch pins are mounted permanently over a plurality of die holes in the base. The hole pattern is varied by manually shifting certain selector members, which are mounted in a groove in the handle, into alignment with pre-selected punch pins so that depressing the handle will operate only such selected punches to punch holes in the sheet.

As is well known, in adjustable perforators having fixed die holes in the base, the number of combinations and spacings of holes is limited because only a relatively few aligned die holes can be crowded together in the available space. Furthermore, there is the high cost of providing a complete head and punch assembly over each die hole in the base. On the other hand, such punches have the advantage that the pattern of holes may be varied with ease.

Another well known form of adjustable perforator is that in which shiftable head assemblies are used. Such head assemblies generally include a frame or head which is provided with a die hole, a stripper plate, a reciprocably mounted punch pin and, usually, a helical spring and retaining ring or equivalent. Since the punch pin and die hole thus may be shifted together as a unit, die holes in the base are, of course, not needed. The number and spacing of patterns of holes are, therefore, practically unlimited.

Adjustable perforators having shiftable head assemblies have, however, certain disadvantages. Chief among these is the usual necessity for detaching complete head assemblies when the required pattern of holes shows less holes than the pattern previously punched in the device. Thus, for example, in punches equipped with three heads, a head assembly must be detached from the perforator when the pattern calls for only two holes. Perforators are in use which have seven head assemblies for seven-hole patterns. When such perforators are required to punch two-hole patterns, fully five head assemblies must be detached from the machine, only to be re-attached later, a rather laborious and time-consuming task.

Attempts have been made in the art to render unwanted punch heads inoperative by disconnecting linkages and the like. Such devices have proved unsuccessful because of the degree of skill required for their operation and because of the time consumed, as well as the high cost of construction.

An object of this invention is to provide a perforator in which an infinite arrangement of holes can be produced without requiring the insertion or removal of punches therein.

Another object of this invention is to provide a perforator in which selected punches can be rendered ineffective without disconnecting or removing any of the punches from the perforator.

Another object is to provide a perforator of relatively low cost and simplicity in construction.

Another object of this invention is to provide a perforator having a plurality of laterally shiftable punch head assemblies mounted in a base and capable of having their punch pins released positively should they fail to rise when the punch handle is released after the down (or operating) stroke.

Another object of the invention is to provide a perforator in which the upward thrust normally applied to each punch pin when the handle is released will tend to act on any other pin or pins that fail to rise.

Another object of the invention is to provide a perforator wherein punch head assemblies may be laterally shifted from an operative to an inoperative location relatively to punch pin actuating means on the handle of the perforator and in which the handle embodies means that is effective throughout its operative areas to positively retract any punch pins that bind regardless of the positions in which the punch head assemblies might be located.

Another object of the invention is to provide such a retracting means between the handle and punch pins that does not affect punch head assemblies that have been shifted laterally into an inoperative or neutral position.

Another object of one form of the invention is to provide a perforator in which the positive retracting means for the pins is normally unused until a pin or pins bind, thus eliminating wear between the parts.

Another object of this invention is to provide a perforator having a plurality of laterally shiftable punch head assemblies in which the punch pins thereof are actuated by an oscillatable shaft and in which selected of said assemblies can be rendered ineffective by only a lateral shifting motion thereof.

Another object of the invention is to provide a perforator of the above identified type in which neutral zones or areas are provided along the path of shifting of the head assemblies at which the oscillatable shaft will be ineffective to depress or raise punch pins of a head assembly located in said neutral zone.

Another object of the invention is to provide such a perforator in which means is provided between the oscillatable shaft and the punch pins of the assemblies that will depress the punch pins when a handle connected to the shaft is depressed, and in the event any punch pins stick in a position lower than their normal upper position, they will positively be raised when the handle is raised.

In one aspect of the invention, a sheet punch press is provided including a plurality of punch head assemblies that are independently adjustable along a rectilinear path for performing various patterns of punching holes in sheets, and in which one or more of the assemblies may be rendered ineffective without removing any of the assemblies from the punch press.

In another aspect of the invention, a handle or pin actuating means is provided for the punch press that extends throughout the length of the press and which includes means for rendering effective or ineffective a central punch head assembly without removing the central punch head assembly from the press. In this aspect of the invention, the central punch head assembly may be shifted to a position or inoperative area where the punch pin actuating means or handle will not contact it in its operative stroke, or the central punch head assembly may be fixed beneath a cavity formed in the handle, and a pivoted baffle may, at will, be moved into or out of registration with the central punch head assembly.

Another aspect of the invention may be to provide a punch press including a supporting plate to which punch head assemblies may be mounted for adjustment along aligned rectilinear slots. The punch head assemblies may comprise hollow housings having vertically aligned holes in which is mounted a punch that is resiliently urged into a non-cutting position and in contact with means on a handle that is designed to activate the punch when the handle is depressed. The handle may also be provided with various forms of means which may cooperate with the punch head rendering it ineffective when the handle is depressed.

In a further aspect and form, means may also be provided between the handle and the punch pins that will be effective to positively retract any pin or pins that become bound in the die holes with which they cooperate. A surface may be provided on each punch pin that is generally transverse to the longitudinal axis of the punch pin that cooperates with a longitudially extending mating surface on a lifting member that is effective only when a punch pin binds in the die hole with which it cooperates. A pin retracting means may be provided between the handle and punch pins that will not only retract any bound pins but which also may be employed to take the place of the contacting means on the handle previously described.

In a further aspect of the invention a base is provided in which a plurality of punch head assemblies are mounted for lateral shifting motion along a straight line, and in which each assembly includes a vertically reciprocable punch pin. The pin actuating means includes an oscillatable shaft extending along a line parallel to the line of shifting of the head assemblies, the shaft passing through each assembly in the vicinity of the punch pins therein. Intermeshing means may be provided between the shaft and each punch pin, so that oscillation of the shaft will cause reciprocation of the punch pins in each assembly, thereby providing positive-acting means for depressing the punch pins when the shaft is moved in one direction of its oscillation, and to provide positive-acting means that will forcibly raise any punch pins that become stuck in any position lower than the normal high position when the shaft is moved in the other direction of its oscillation.

The shaft may be provided with one or more areas or zones along its length in which its intermeshing means may be omitted, or recesses provided so that when a punch head assembly has been laterally slid into such an area or zone, oscillation of the shaft will not act on the punch pin thereof to depress or raise it.

The above as well as other objects and novel features of the invention will become apparent from the following description and accompanying drawings, which are merely exemplary.

In the drawings:

FIG. 3 is a top plan view of the punch with the handle and certain other parts omitted, for clarity;

FIG. 4 is a section taken along the line 4—4 of FIG. 3, with some of the parts omitted, for clarity;

FIG. 5 is a front elevational view of the punch on a somewhat reduced scale from that of FIG. 4;

FIG. 6 is a top plan view of the punch embodying the principles of the invention;

FIG. 7 is a fragmentary sectional view similar to FIG. 1 and showing a modification of the invention;

FIG. 8 is a fragmentary central sectional view similar to FIG. 1 and showing another modification of the invention;

FIGS. 9, 10 and 11 are similar to FIGS. 3, 4 and 5, showing a modification of the invention;

FIG. 12 is a sectional elevational view of a "desk-type" perforator to which the principles of the invention have been applied;

FIG. 13 is a sectional elevational view of portion of a perforator taken substantially along line 13—13 of FIG. 15, and to which the principles of the invention have been applied with the handle thereof shown in an elevated position;

FIG. 14 is a view similar to that of FIG. 13 with the handle in a depressed work-performing position;

FIG. 15 is a rear elevational view of the perforater of FIG. 13, partly in section and with certain parts removed for clarity;

FIG. 16 is a perspective view of a detail of the invention;

FIG. 17 is a sectional elevational view of a form of perforater somewhat different from the form shown in FIG. 13, and to which the principles of the invention have been applied;

FIG. 21 is a modification of a detail of the structure shown in FIG. 20;

FIG. 22 is a top plan view of one form of a perforator to which the principles of the invention have been applied with handle omitted;

FIG. 23 is a sectional view taken substantially along line 23—23 of FIG. 22;

FIG. 24 is a fragmentary view of the left side of the perforator shown in FIG. 22;

FIG. 25 is a front elevational view of the perforator shown in FIG. 22;

FIG. 26 is a partial sectional view taken substantially along the line 26—26 of FIG. 25;

FIG. 27 is a fragmentary sectional view taken substantially along the line 27—27 of FIG. 25;

FIG. 28 is a sectional elevational view of the base of the perforator of FIG. 22;

FIG. 29 is a partial sectional view taken along the line 29—29 of FIG. 22;

FIG. 30 is a partial sectional view along the line 30—30 of FIG. 22; and

FIG. 31 is a plan view of a modified structure to which the principles of the invention have ben applied.

Figure 1:
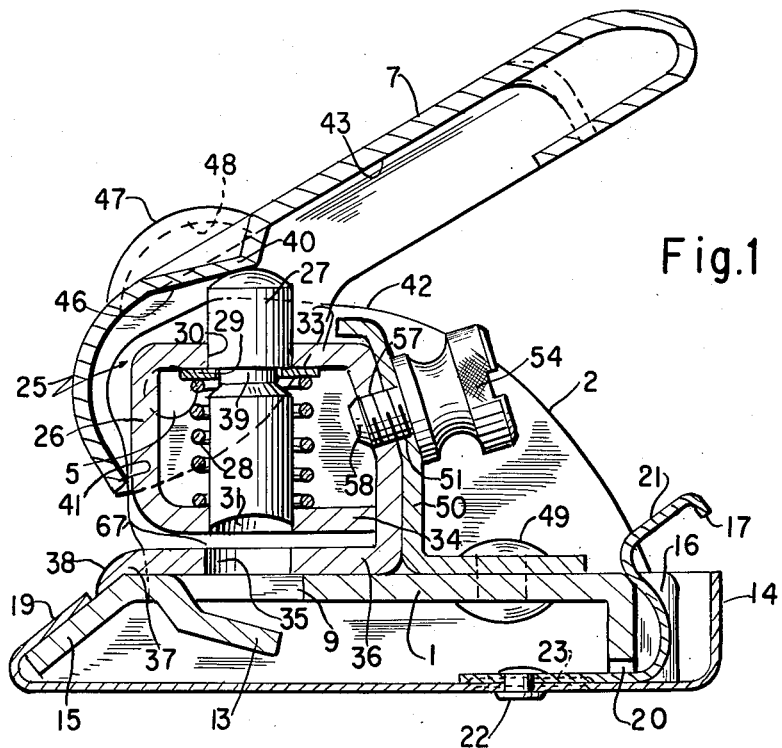
FIG. 1 is an enlarged sectional elevational view taken substantially along the line 1—1 of FIG. 3.
Figure 2:
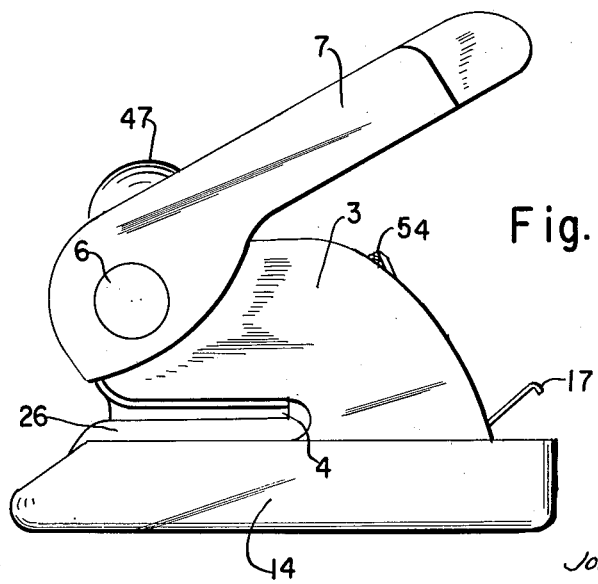
FIG. 2 is a right end elevational view of the punch shown in FIG. 1.

Referring to the form of the invention shown in FIGS. 1 to 6, a simple hand-held form of paper punch is shown. Three head assemblies 25 are shown in FIGS. 3, 4 and 5, a number commonly used in such punches. As will be shown later, the number of head assemblies 25 may be increased substantially by slightly modifying the device. In the figures, a base member 1 has two upturned side ears 2 and 3. The ear 3 has an elongated slot 4 as shown in FIGS. 2, 4 and 5. The slot 4 enables insertion of sheets which are wider than the base 1. Ear 2, among other functions, may act as a guide and an abutment for the sheets, and serves to align the center of the popular 8½-inch by 11-inch paper size with the center of the perforator. Thus, a pape gauge is provided for one size of sheet only, as is common practice in this general type of perforator. It will be understood, however, that the device is not limited to using such gauges. Ear 2, for example, may also have a slot similar to slot 4 so that the perforator could center sheets substantially wider or narrower than the base 1, and other well known types of paper gauges may also be used, such, for example, as double-geared gauges.

Ear 2 may be perforated for the reception of a rivet 5 and ear 3 may similarly be perforated for receiving a rivet 6. Thus, a pair of aligned pivots is provided for securing a handle 7 to the base 1 as will be described later.

The base 1 may be provided with three elongated slots 8, 9 and 10 (FIG. 3) preferably formed by piercing the base and depressing tongues or baffles 11, 12 and 13, respectively, in the manner clearly shown in FIG. 1. These slots 8, 9 and 10 serve to pass waste punchings into a receptacle 14, and the tongues 11, 12 and 13 are sloped in a manner to permit downward passage of cuttings, and also to act as shields to prevent accidental spilling to the cuttings when the perforator is held in the hand and is tilted forwardly. It should be understood that the device is not limited to the use of the baffles 11, 12 and 13 such as shown, since many other equivalent means may be used. Nor is the device dependent for its operation upon such baffles, since the hand-held form shown in the figures need not be tilted to cause spillage, and tongues or baffles 11, 12 and 13 could be omitted entirely, leaving simple slots in the base. Such slots would be fully adequate, particularly when the device is made in the more common desk-type frequently seen in the art, that is, where the device remains on the desk while the perforating operation is performed.

The forward end of the base 1 is sloped to form a nose 15 (FIG. 1) and the rear end is indented to provide clearance for a spring clip 17 that may be fastened by a rivet 22 to the bottom of receptacle 14 and which spring clip 17 engages the base 1 at the rounded corner surface 18 thereof. The spring clip 17 passes through a slot 20 in base 1, and is fashioned and positioned so that it presses on the base 1 both downwardly and forwardly, thus keeping a bent-up portion 19 of the forward end of receptacle 14 tightly engaged with the nose 15 of the base 1. It also pulls the receptacle 14 generally upwardly into tight engagement with the bottom surfaces of the base 1. It will be understood that thumb pressure at 21 on the clip 17 will enable disengagement of the receptacle 14 from the base 1 to permit emptying the receptacle. To reassemble these parts, the nose 15 of the base 1 is inserted as far as possible into the forward end 19 of the receptacle, whereupon pressing the base and the receptacle relatively toward each other will cause automatic latching of the two together. The clip 17 is prevented from rotating on the rivet 22 by raised pads 23 on each side.

The latching apparatus for the receptacle need not be limited to the form shown since other forms of construction may be used, such, for example, as hinged or slidable securing means between the receptacle 14 and the base 1.

A graduated scale 24 is shown imprinted on bent-up portion 19 of the receptacle 14. Such a scale could be located on nose 15 of base 1 if portion 19 of the receptacle 14 were relatively narrow. It could also be situated on the rear of a bracket 50 to be presently described. The purpose of this scale or any other equivalent series of lines is to assist in locating the shiftable head assemblies 25 as will be fully explained herein.

In the embodiment of the invention shown in FIGS. 1 to 8, inclusive, three head assemblies 25 are disclosed. Each may comprise a head 26, a punch pin 27, a punch spring 28 and a split retaining ring 29 (FIG. 1). The head 26 may be made by any suitable process such as casting, die forming, etc. In the form shown, a steel strip fabricated in a punch press provides three aligned, preferably reamed, holes 30, 31 and 35 of identical size, for the reception of the punch pin 27. The uppermost hole 30 is located in the top wall 33 and acts as a guide, while the intermediate hole 31 is located in a stripper plate or wall 34, and the die hole 35 is located in a bottom die plate or wall 36. The forward end of the plate 36 is bent to match the slope of the nose 15 of the base 1 to provide adequate support thereby, and the forward end 37 is preferably coined thin so that it presents no obstacle to the insertion of sheets to be perforated, as clearly shown in FIG. 1. A tell-tale or index line 38 may be provided on the forward bent end of plate 36 and cooperates with a scale 24 (FIG. 5) to assist in choosing various patterns of holes when the head assemblies 25 are laterally shifted, as will be fully explained later herein.

Punch spring 28 normally presses upwardly against the split retaining ring 29 which surrounds and extends within a peripheral groove 39 on the punch pin 27, thus causing said punch pin 27 to be normally urged upwardly. In its uppermost position, the punch pin 27 is normally held in contact with depressed portions 40 of the handle 7, thus normally holding the handle 7 in an elevated position. The upward swing of handle 7 is preferably limited by points 41 on handle 7 abutting both ears 2 and 3 of base 1. Furthermore, the ears 2 and 3 are each provided with sloping surfaces 42 which are located so that upon completion of the downward or operating stroke of the handle 7, the ceiling 43 thereof will abut said surfaces 42, thus limiting the down-stroke in a desirable manner.

Handle 7, as aforementioned, is provided with depressed portions such as portion 40 of the form shown in section in FIG. 1. The portion 40 is located preferably on the right side of the handle as shown in FIGS. 5 and 6. Also shown are a similar depressed portion 44 on the left side and a relatively short, depressed portion 45 at the center.

As clearly shown in FIG. 1, the depressed portion 40 is adapted to press downwardly against punch pin 27 so as to operate said punch pin for perforating sheets, when the handle 7 is manually depressed. It should be noted that the surface 46 which engages the punch pin 27 is preferably flat and sloped at a carefully chosen angle whereby there will be a minimum of lateral thrust exerted by the punch pin 27 at all positions of the operating stroke. That is, the lateral component of the load is minimized, and a minimum of friction and wear under such conditions occurs.

Close to the centrally located depressed portion 45 is a spherical raised portion 47, thereby providing a chamber with a spherical ceiling 48. Ceiling 48 is high enough so that if a head assembly 25 is positioned directly under portion 47, handle 7 may be depressed with a complete downstroke without actuating the punch pin 27 of said head assembly 25. Thus, an inoperative area or non-operating or neutral zone has been provided in which the central head assembly 25 may be stored at such times as it is desired to punch a two-hole pattern, in which case the central head assembly is not needed.

The invention is not limited to the use of a spherical raised portion 47, as described above. Obviously, depressed portions 40, 44 and 45 may be substantially deeper than shown in the figures, thus making it possible entirely to eliminate raised portion 47. With the depressed portions deep enough, a punch pin located between them will be inoperative because the ceiling 43 of handle 7 will be too high relative to said depressed portions 40, 44 and 45 to contact and move the top of punch pin 27 downwardly during the downstroke of handle 7.

Thus, a neutral zone or inoperative area may be created without use of raised portion 47. Furthermore, one may achieve the same effect without using raised portion 47 and without depressed portions 40, 44 and 45. Thus, with a high enough ceiling 43 on handle 7, one could secure suitably shaped metal blocks to ceiling 43, said blocks having the same general working surfaces as the depressed portions. These could be substituted for all of said depressed portions 40, 44 and 45, and the raised portion 47. It is also obvious that by casting the handle 7, the equivalent effects could be obtained with simple and obvious modifications which do not alter the effects obtained or the scope of the invention.

Secured to the base 1, by means of a rivet 49, is an adjustor bracket 50, of the general form shown in FIGS. 1, 3 and 4. As best shown in FIG. 1, the bracket is bent to conform closely to the shape of heads 26. Bracket 50 is provided with a longitudinally extending slot 51 on its right side, a similar slot 52 on its left side, and a relatively short slot 53 starting at its center and extending slightly to one side.

The three head assemblies 25 are provided, respectively, with set screws 54, 55 and 56, and each head 26 has a tapped hole 57 as shown in FIG. 1. The threaded portions 58 of each of said set screws extend through the corresponding slot 51, 52 and 53 and are free to slide laterally therein. Thus, by slightly loosening a set screw such as 54, a head assembly such as 25 may be shifted laterally to any desired point within slot 51 and may be releasably secured there by set screw 54.

It should be clearly understood that the invention is not limited to a securing means such as the set screws described above. For example, a device similar to that shown in my prior Patent 2,534,094 (see FIG. 6 of said patent) may be used here; that is, a latching means cooperating with a friction-type locking means to position and hold the head assemblies at selected positions may be employed. Such a device is shown in FIG. 7, in which a knob 55' has a reduced portion 56' which extends slidably through slot 51 in bracket 50. The portion 56' also extends through a hole 57' in head 26. When assembling the parts, portion 56' is riveted or staked over as at 58' in such a manner as not to lock the assembled knob 55', head 26 and bracket 50 together tightly, thereby leaving sufficient end-play to permit lateral manual shifting of knob 55' together with head assembly 25 relative to slot 51.

Bracket 50 may be provided with notches, grooves, holes or spherical indentations 59 and 60. Knob 55' may have one or more cylindrical bores 61 and 62 in which may be located helical springs 65, 66 for urging spherical plungers or balls 63, 64 into mating contact with the indentations 59 and 60 in bracket 50. Thus, a simple friction means is provided for positioning and releasably holding the head assemblies 25 at selected positions along bracket 50. It will be understood that such a friction device could conveniently be used as shown with indentations 59 and 60 in base 1 as well as in the bracket 50, by slightly modifying the construction. It should be further understood that the indentations 59 and 60 may be located at points corresponding to pre-selected hole patterns, so that, for example, certain popular patterns may easily be selected, or, alternatively, such indentations 59 and 60 may be provided in equal increments, say one-eighth of an inch apart, to position and hold the heads 25 in any conceivable pattern. Alternatively, one may use the lower indentations 59 for predetermined popular patterns only, while using the upper indentations 60 for all possible patterns. Used together, there is the advantage of obtaining a stronger holding force at popular pattern spacings, while still enabling a setting at any unusual spacing.

The device is not limited to the forms of latching devices mentioned. As an additional example, one could use a spring-loaded cylindrical plunger in knob 55' which could be tapered at its operating end for easy entry into suitably spaced holes in bracket 50, thus comprising a positive, non-friction type of lock. Such devices are well known in the art. As an example, see FIG. 3 of United States Patent No. 756,902.

In operating the above described punch, let it be assumed that it is desired to perforate standard 8½" x 11" sheets with three one-quarter inch diameter holes spaced 4¼ inches apart, to fit a certain popular binder size. The head assemblies 25 would then be positioned as shown in FIGS. 3, 4 and 5. FIG. 5 shows how the index lines 38 on heads 26 are positioned to indicate 4¼–0–4¼ on scale 24. With head assemblies 25 secured by set screws 54, 55 and 56 against displacement, handle 7 may be depressed until its ceiling 43 abuts sloping surfaces 42 on ears 2 and 3 of base 1, thus completing an operating or downstroke. Punch pins 27 will then perforate whatever sheets may have been inserted in the space 67 (FIG. 1) between stripper plate 34 and die plate 36 of the head 26.

To punch any other desired pattern of three holes in which there is a central hole and two other holes, one on each side of center, the central head assembly 25 remains located as shown in the figures, but the head assemblies 25 on the right and left of center are adjusted as required. Thus, for example, if it is required to punch a three-hole pattern with the holes 3½ inches apart, the indicator lines 38 on the left and right heads 25 would be adjusted to each indicate 3½ inches on the scale. Such adjustment may be made quickly and easily by slightly loosening the set screws of the respective head assemblies 25, sliding said assemblies to the proper points and retightening said set screws. Such adjustment could also be achieved by the alternative methods mentioned above.

If it is desired to punch a two-hole pattern of holes, unlike most other devices having shiftable hands in the art, it is not necessary to remove the central head from the perforator. The central head assembly 25 may be easily and rapidly rendered inoperative by sliding it to the left (FIG. 4) as far as permitted by slot 53 in bracket 50. Set screw 54 will abut end 68 of slot 53, thus automatically locating the central head assembly 25 in the neutral zone previously described, where punch pin 27 is located directly under spherical raised portion 47 in handle 7. Accordingly, upon depressing handle 7, punch pin 27 of the central head 25 will not be depressed or otherwise actuated, the top of the punch pin merely entering the cavity under ceiling 48 of the raised portion 47.

With the central head assembly 25 rendered inoperative as described, the two remaining head assemblies may be adjusted and operated to perforate any selected two-hole pattern.

Thus, while possessing the complete versatility of a perforator with adjustable head assemblies which, as previously explained, carry their own die holes with them when they are shifted laterally, the present invention also has the important advantage that a head assembly may be easily and quickly rendered inoperative without removing it from the perforator and without expensive, impractical constructions requiring a large measure of skill for their operation.

To restore the device so that it can perforate three-hole patterns, one merely shifts the central head 25 out of the neutral zone mentioned above, and back to the central location shown in the drawings. It should be noted that the length of slot 53 has been chosen to facilitate quick and easy shifting of the central head assembly 25 in and out of neutral position; that is, shifting to the left as far as slot 53 permits, accurately locates the head in the neutral zone, and shifting to the extreme right limit of the slot 53 accurately locates the central head 25 in its operative zone. Furthermore, in punching the popular 4½–0–4½ centers for three holes, as previously described, the two outer head assemblies need merely to be urged to the outer extremes of slots 51 and 52, at which points they will be accurately positioned as required.

It should be clearly understood that while the embodiment described above is intended primarily for the perforating of two- and three-hole patterns and without the need to detach a head assembly from the perforator, the construction does not prevent using the device in the conventional manner; that is, the head assemblies may be attached or detached in the usual way. For example, if one wishes to perforate a five-hole pattern with the perforator constructed as above, one could, of course, attach two additional head assemblies, either by inserting them through a gap or window 69 in bracket 50 (FIG. 4), or by providing quickly detachable pivots in place of rivets 5, such as screws or the like, so that handle 7 may be easily removed to enable attaching or detaching head assemblies at will. For that matter, the handle 7 could be fashioned so that added head assemblies could be installed without removing the head at all. Thus, it is within the scope of the present invention to construct the perforator in the conventional desk-type form shown in FIG. 12, wherein the handle 7 is pivoted near the rear of the device by rivets 6' or the like and dips forwardly (toward the front of the perforator) when depressed for the working stroke. In such types it is evident from an inspection of FIG. 12 that insertion or removal of additional head assemblies is easily achieved without removing the handle, and without the need for special windows and the like, since they can be readily removed (or installed) from the front of the device.

Primarily, the present device is intended to be used without the need to attach or detach head assemblies, once initially installed. Accordingly, a modification of this invention, enabling the use of a large number of such head assemblies, will be described later herein.

Before departing from the type described above, a simple modification will be described here. By this modification, the central head assembly is rendered operative or inoperative at will and without removal from the perforator, but by different means from that hitherto described.

Referring to FIG. 8, a central head assembly 25a is secured to an adjustor bracket 50a by means of a screw 54a which is screwed into a tapped hole in a head 26a. Any other means of securing said head may be used, such as welding it to said bracket, or to the base, as it is unnecessary to slide said head assembly relatively to said bracket and said base in this modification. Of course, by using a detachable fastener such as screw 54a, replacement of worn parts is facilitated. Nevertheless, it is within the scope of this modification of the invention to secure the central head permanently and, if desired, to use a hole in the base itself as a die hole, as is frequently seen in the art.

Handle 7a has a raised spherical portion 47a located, in this modification, directly over the fixed operative position of the central head assembly. A rivet 71 is revolubly mounted in a hole 70 in the handle 7a. The rivet 71 may be peened over as at 74. By splining or the like, a baffle 76 may be secured to, and turned with said rivet 71. The baffle may be of metal, preferably hardened, and is formed to present a punch operating surface 75 similar to sloping surface 46 previously described. A knob 72 having an index or tell-tale line 73 may be secured to the rivet 71 so that said knob, rivet 71 and baffle 76 may be rotated as a unit, and the index line 73 may indicate the direction or orientation of baffle 76. Simple stops, not shown, may be used to limit the rotation of knob 72 to its exact operative and inoperative positions.

The construction just described applies preferably to the central head assembly and related parts. It is understood that depressed portions 40 and 44, or their operative equivalents as previously described, are retained and function as previously described.

From the foregoing it is evident that the central head 25a may be rendered operative by rotating knob 72 and baffle 76 until the orientation is as shown in FIG. 8. Depressing handle 7a will depress and operate the punch pin 27a to perforate a hole. Should baffle 76 be rotated through 90° or so, no part of the baffle will then be in a position to contact and depress punch pin 27a when the handle 7a is depressed. The top of the punch pin 27a will then extend inoperatively into the area of raised portion 47a, and the downstroke of the handle 7a will be completed without affecting the punch pin 27a, so that the latter is then inoperative as required.

This modification is not limited to the use of a rotative baffle 76. The baffle could be slidably mounted on the handle 7a, for example, with a slot in the handle to permit reciprocating sliding of the rivet 71. Furthermore, the various methods previously described of substituting equivalents for the raised spherical portion 47a apply as well in this modification. Thus, a thicker baffle 76 mounted on a higher ceiling 43 obviates the need for a raised spherical portion such as the portion 47a.

By another important modification, it will now be shown that a large number of head assemblies may be used, with many neutral zones provided in the device, so that, for example, a seven-head assembly capable of punching seven holes simultaneously, may be adjusted easily and rapidly to punch, for instance, only two holes simultaneously, without detaching a head assembly from the perforator.

Referring to FIGS. 9, 10 and 11, which are similar to FIGS. 3, 4, 5 and 6, seven head assemblies are shown instead of three as formerly, and they are designated 77, 78, 79, 80, 81, 82 and 83. The central head assembly 80 and its related parts are unchanged. Thus, slot 53 in bracket 50 and slot 10 in base 1 are unchanged. Also unchanged is raised portion 47 in handle 7. In brief, central head assembly 80, all related parts which control its operativeness or inoperativeness, as well as manipulation by the user, are unchanged from the central punch assembly 25 and related parts and the operation previously described, except as they may be varied or modified as proposed above.

It should be noted, however, that slots 51a and 52a in bracket 50 are substantially longer at their outer ends than the previously described corresponding slots. Slots 8a and 9a in base 1 are also substantially longer at their outer ends than before. Two elongated beads or raised portions 84 and 85 have been added, one at each end of handle 7. In all other important respects, the construction is substantially unchanged from that previously described and shown in FIGS. 3, 4, 5 and 6.

As indicated above, the present modification enables punching many holes simultaneously without loss of the advantages set forth above. In the embodiment shown in FIGS. 9, 10 and 11, a popular seven-hole pattern may be punched when the head assemblies are secured as shown, namely, a 4¼–3¼–2¼–0–2¼–3¼–4¼ pattern, as best shown in FIG. 9. Thus, a perforator equipped with seven head assemblies punches this pattern of seven holes simultaneously. It will now be shown how a perforator so equipped may be used for other less abundant patterns.

Let it be assumed that a symmetrical five-hole pattern must be punched. It is, therefore, necessary to render inoperative one head assembly on each side of center. This effect is easily achieved. Head assembly 77 on the left side is shifted as far as possible to the left, that is, until it stops at end 86 of slot 52a in bracket 50. Similarly, head 83 is shifted to the extreme right until it stops at end 87 of slot 51a in bracket 50. Head assemblies 77 and 83 have thus been shifted into neutral zones of the sort previously fully described, and they are thereby rendered inoperative. The remaining five head assemblies may obviously now be adjusted to any symmetrical five-hole pattern, without disturbing the central head assembly.

If a four-hole symmetrical pattern is desired, central head assembly 80 is shifted into its neutral zone by sliding it leftward to the limit of slot 53 in bracket 50, and the end 68 of said slot will automatically stop said head assembly exactly in its neutral zone.

If one of the popular three-hole patterns is desired, central head assembly 80 is placed in operative position, then assemblies 77 and 78 are both shifted to the left as far as possible, and head assemblies 82 and 83 are shifted to the right as far as possible. Elongated beads or raised portions 84 and 85 provide the high ceiling areas necessary to render the respective pairs of punch heads inoperative. Thus, two head assemblies on each side have been positioned in neutral zones and rendered inoperative, leaving but three operative head assemblies, as required. These may be adjusted as the required pattern demands as fully explained previously.

Adjusting the device to now produce any symmetrical two-hole pattern is very simple. The central head assembly 80 is simply shifted leftward into its neutral zone, so that now the central head assembly 80 as well as head assemblies 77, 78, 82 and 83 are inoperative. Adjustment of the two remaining head assemblies is achieved as before, to produce two-hole symmetrical patterns.

It should also be clear that a nearly infinite number of asymmetrical patterns may be produced if desired, but such patterns are relatively rare.

In the embodiment of the invention shown in FIGS. 13 to 17, inclusive, three head assemblies 125 are disclosed. Each may comprise a head 126, a punch pin 127, a punch spring 128 and a split retaining ring 229 (FIG. 13). The head 126 may be made by any suitable process such as casting, die forming, etc. In this form, a steel strip may be fabricated in a punch press to provide three aligned, preferably reamed, holes 130, 131 and 135 of identical size for the reception of the punch pin 127. The uppermost hole 130 is located in the top wall 133 and acts as a guide, while the intermediate hole 131 is located in a stripper plate or wall 134, and the die hold 135 is located in a bottom die plate or wall 136.

Punch spring 128 normally presses upwardly against the split retaining ring 129 which surrounds and extends within a peripheral groove 139 on the punch pin 127, thus causing said punch pin 127 to be normally urged upwardly. In its uppermost position, the punch pin 127 is normally held in contact with depressed portions 140 of the handle 7A, thus normally holding the handle 7A in an elevated position. The upward swing of pin actuating means or handle 7A is preferably limited by points 141 on handle 7A abutting ears 2A and 3A of base 1A. Furthermore, the ears 2A and 3A are each provided with sloping surfaces 142 which are located so that upon completion of the downward or operating stroke of the handle 7A, the ceiling 143 thereof will abut said surfaces 142, thus limiting the downstroke in a desirable manner.

Handle 7A, as aforementioned, is provided with depressed portions such as portion 140 of the form shown in section in FIG. 13, such providing an operative area. The portion 140 is located preferably on the right side of the handle as shown in FIG. 15. Also shown are a similar depressed portion 144 on the left side and a relatively short, depressed portion 145 at the center.

As clearly shown in FIG. 13, the depressed portion 140 is adapted to press downwardly against punch pin 127 so as to operate said punch pin for perforating sheets, when the handle 7A is manually depressed. It should be noted that the surface 146 which engages the punch pin 127 is preferably flat and sloped at a carefully chosen angle whereby there will be a minimum of lateral thrust exerted by the punch pin 127 at all positions of the operating stroke. That is, the lateral component of the load is minimized, and a minimum of friction and wear under such conditions occurs.

Close to the centrally located depressed portion 145 is a spherical raised portion 147, thus providing a chamber with a spherical ceiling 148. Ceiling 148 is high enough so that if a head assembly 125 is positioned directly under portion 147, handle 7A may be depressed with a complete downstroke without actuating the punch pin 127 of said head assembly 125. Thus, there is provided an inoperative, non-operating or neutral zone in which the central head assembly 125 may be stored at such times as it is desired to punch a two-hole pattern, in which case the central head assembly is not needed.

The invention is not limited to the use of a spherical raised portion 147 is described above. Obviously, depressed portions 140, 144 and 145 may be substantially deeper than shown in the figures, thus making it possible entirely to eliminate raised portion 147. With the depressed portions keep enough, a punch pin located between them will be inoperative because the ceiling 143 of handle 7A will be too high relative to said depressed portions 140, 144 and 145 to contact and move the top of punch pin 127 downwardly during the downstroke of handle 7A.

Thus, a neutral zone may be created without use of raised portion 147. Furthermore, one may achieve the same effect without using raised portion 147 and without depressed portions 140, 144 and 145. Thus, with a high enough ceiling 143 on handle 7A (FIG. 21), one could secure suitably shaped metal blocks to ceiling 143, said blocks having the same general working surfaces as the depressed portions. These blocks could be substituted for all of said depressed portions 140, 144 and 145 and the raised portion 147. It is also obvious that by casting the handle 7A, equivalent effects could be obtained with simple and obvious modifications which do not alter the effects obtained or the scope of this invention.

Secured to the base 1A, by means of rivets (not shown), is an adjustor bracket 150 of the general form shown in FIGS. 13 and 14. As best shown in FIG. 13, the bracket is bent to conform closely to the shape of heads 126. Bracket 150 is provided with a longitudinally extending slot 151 on its right side, a similar slot 152 on its left side, and a relatively short slot 153 starting at its center and extending slightly to one side.

Each of the head assemblies 125 is provided with a set screw such as 154, 155, 156, and each head 126 has a tapped hole 157 as shown in FIG. 13. The threaded portions 158 of each of said set screws extend through the corresponding slot 151, 152 and 153 and are free to slide laterally therein. Thus, by slightly loosening a set screw, such as 154, a head assembly such as 125 may be shifted laterally to any desired point within slot 151 and may be releasably secured there by set screw 154.

It should be clearly understood that the invention is not limited to a securing means such as the set screws described above.

Punch pin 127, when at rest, projects relatively high above the top of head 126, thus providing room for a peripheral groove 202. Secured to handle 7A by a spot-weld 205, or by other suitable means such as riveting or integral casting, is a lifter bracket 204. The lifter bracket 204 is shown in relatively enlarged perspective in FIG. 16. The bracket 204 is preferably of stamped sheet metal construction, but may be made of drawn steel, cast, or otherwise within the scope of the invention. It may be provided with one or more depending flanges 206 and one or more lateral flanges 207, which latter may be located within the peripheral groove 202 on punch 127 between an upper shoulder 208 and a lower shoulder 209 that are joined by a neck 210.

The above described elements are proportioned and positioned so that, normally, lateral flange 207 is positioned in the groove 202 and in engagement (or nearly so) with the upper shoulder 208 when the handle 7A is at the end of the downward or working stroke (FIG. 14), the lateral flange 207 is remote from the upper shoulder 208 and, in fact, is nearly (but not quite) in engagement with lower shoulder 209. It should be noted that the space between shoulders 208 and 209 is preferably substantially greater than would be required merely for reception of lateral flange 207 with ordinary working clearance. It is to be understood that the specific form of the flange 207 and groove 102 is merely exemplary and that other forms of engaging means may be employed. So long as there is a surface on pin 127 that is generally transverse to the longitudinal axis of the pin which cooperates with a longitudinally extending lifting surface on the handle 7A or means operated by the handle 7A, the same results will be achieved. Thus, a peripheral tooth may be employed on the pin 127 instead of the groove 202, and it may be designed to cooperate with a grooved lifter bracket instead of the single tooth-like longitudinally extending lip 207 shown in FIG. 16.

Lifter bracket 204 may be formed with a cutaway portion or gap 211 which aligns with gap 169 in adjustor bracket 150, as shown in FIG. 15. The function of gap 211 is similar to that of gap 169, as previously described, namely, to permit insertion or withdrawal of head assemblies 125 when the device is made in the form shown in FIG. 13. As stated above, however, a gap such as 211 is not required where other means is provided that will enable insertion of the head assemblies.

Lifter bracket 204 is preferably provided with another gap 212 which, as shown in FIG. 15, is arranged in alignment with the neutral zone in the area of spherical raised portion 147 in handle 7A. Gap 212 is used with the parts arranged and proportioned as shown in FIG. 15, but it should be understood that if the space between shoulders 208 and 209 on punch pin 127 is made sufficiently large, that is, if shoulder 209 is lowered sufficiently, gap 212 may be omitted entirely.

At the beginning of the downstroke, the parts are related as in FIG. 13. As the handle 7A is manually depressed, surface 146 of depressed groove 140 depresses punch pin 127 as previously described. As handle 7A descends, it carries with it lifter bracket 204 whose lateral flange 207 descends freely in peripheral groove 202 of said punch pin. Due to the fact that lateral flange 207 travels faster and farther (in its arcuate path) than groove 202 of said punch pin 127 (in its straight downward path), it should be noted that at the end of the downstroke, flange 207 will reach nearly to lower shoulder 209, as shown in FIG. 14. It should be clear that on the downstroke just described, surface 146 alone forces punch pin 127 downwardly, and lifter bracket 204 and its lateral flange 207 do not, in this embodiment, push downwardly on said punch pin.

On the following upstroke which normally occurs when the handle is released, punch spring 128 will normally lift punch pin 127 which, in turn, will press upward against the surface 146, raising the handle 7A and restoring all parts to the position shown in FIG. 13. Thus, normally, during the upstroke as well as on the downstroke described above, lifter bracket 204 and lateral flange 207 do not actuate the punch pin 127.

Occasionally, however, punch pins tend to stick in the down-position shown in FIG. 14, usually due to the fact that wear on both the punch pin 127 and the die hole 135 results in an unusually large clearance space between these parts, so that paper cuttings tend to wedge between them, binding the pin 127 so securely that spring 128 is inadequate to lift the parts upward to the position of FIG. 13. Only when the punch pin sticks in the down-position does lifter bracket 204 function usefully. In the event one punch pin only, for example, sticks and others do not, springs of the non-sticking punches may succeed in raising the handle automatically. Should these springs not succeed, or if all punches stick and the handle remains in the lowered position, the handle will be required to be lifted manually. In this event, the handle 7A will be forced manually upwardly from the position shown in FIG. 14 until lateral flange 207 on lifter bracket 204 engages upper shoulder 208 on punch pin 127, and as the handle is forced farther upwardly, the stuck punch pin or pins will be pulled out of the die hole, freeing the parts and restoring them to the normal upper position.

It will be clear from the above that a highly practical, simple and inexpensive device has been provided for freeing stuck punch pins, having the unusual merit that in normal operation it has no work or duty on either the working stroke or the return stroke and, therefore, normally does not wear, yet will positively function to free punches if they should stick in the down-position regardless of the position in which operative punch head assemblies may be located.

The lifting device described above is designed to permit the user to shift unwanted head assemblies into neutral zones or inoperative areas, where they are rendered inoperative. This may be seen, for example, by reference to FIG. 15. As previously explained, gap 212 in lifter bracket 204 is aligned with the neutral zone under spherical raised portion 147 in handle 7A. Depending flange 206 and lateral flange 207 have been cut away (or omitted) to define the gap 212. When a head assembly which is to be rendered inoperative is shifted into a neutral zone, the handle 7A, upon being operatively depressed, will not act on the punch pin of said assembly. Although the handle 7A continues to move lower, there is no danger that lateral flange 207 will engage lower shoulder 209 on the punch pin 127 since the lateral flange 206 has been cut away to define the gap 212. Furthermore, as previously indicated, even though gap 212 is omitted and the lateral flange 207 remains unbroken at said neutral zone, the device would still operate as required if shoulder 209 on punch pin 127 were lowered substantially, thus increasing the height of peripheral groove 202. Obviously, if the shoulder 209 is remote enough, lateral flange 207 cannot reach it during the full downstroke of the handle, and the punch pin 127 will not be depressed.

It should be understood that the above described construction and operation apply equally well to any other neutral zones, including the zones 184 and 185 at the ends of the perforator, as shown in FIG. 15. A lifter bracket such as shown in FIG. 16 would serve for this purpose, since the bracket is of such short length as not to extend into the neutral zones 184 and 185 at each end of the base 1A, as shown in FIG. 15.

FIG. 17 shows a fragmentary sectional view of a simple modification indicating how the invention may be embodied in a desk-type punch, as distinguished from the hand-held type shown in the previous figures. It should be noted that the present type is usually positioned on the surface of a desk or the like so that the user may apply stronger pressure. Usually such types have greater capacity for sheets to be perforated simultaneously, and usually the construction is somewhat heavier than the hand-held type. Furthermore, as indicated in FIG. 17, the handle is usually mounted so that it swings downward and forwardly. The handle 213 is usually relatively long, for greater mechanical advantage, and the travel of the handle may obviously be much greater.

An adjustor bracket 214 may be secured to the base by riveting, welding or the like. It should be noted that bracket 214 need not be provided with a window or gap 169 as in adjustor bracket 150, because the head assemblies may be readily removed (or installed) from the front of the device without the need to pass through such a window. Nor is a gap 211 required for lifter bracket 204, as the head assemblies 125 may now be installed or removed through either end of the bracket. The handle 213, base 215, head 216, receptacle 217 and other parts are obviously modified as generally shown in FIG. 17. It should be understood that paper gauges of standard form, or double gauges of the geared type may be used in this form of the invention, if desired.

Figure 18:
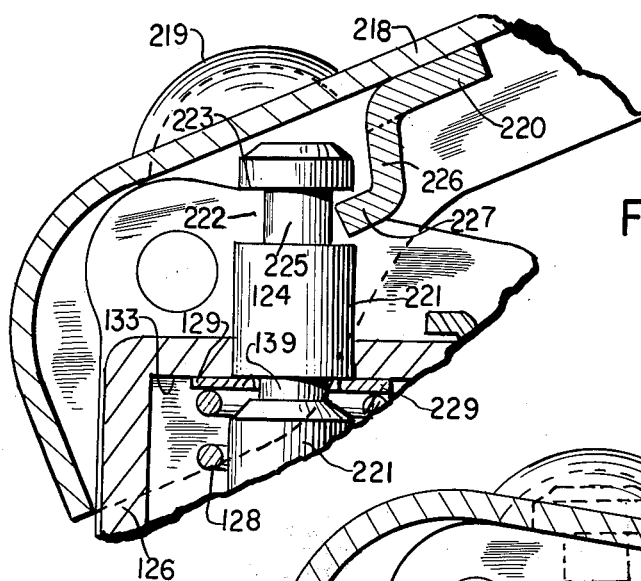
FIGS. 18, 19 and 20 are views similar to those of FIGS. 13 and 14, showing a modified form of the invention.
Figure 19:
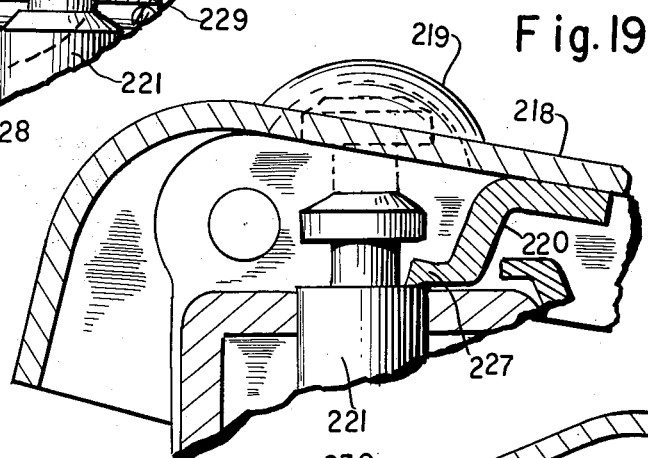

FIG. 18 shows a modification of the invention with the operating handle 218 in the upper position, and FIG. 19 shows the handle 218 in the lowermost position.

Referring to FIGS. 18 and 19, handle 218 differs from those previously described in that here there is no depressed groove such as groove 140 in FIG. 13, and, consequently, there is no surface such as surface 146 in FIG. 13, for engaging and pressing down the punch pins. There is, however, a spherical raised portion 219 similar to raised portion 147 previously described and for similar purposes, and likewise there may also optionally be elongated beads such as raised portions 184 and 185 previously described.

A lifter-pusher bracket 220 having one or more depending flanges 226 and lateral flanges 227 is secured to handle 218, as by welding, riveting, integral casting or the like. Said lifter-pusher bracket is similar in construction to lifter bracket 204 previously described, except that it is preferably of heavier construction and there are differences in function to be described later herein.

Punch pin 221 has a peripheral groove 222 defined by a neck 225, an upper shoulder 223 and a lower shoulder 224. Groove 222 is similar to groove 202 previously described, except that groove 222 is substantially shorter in height, between said shoulders, for reasons which will be evident later.

The operation of the device shown in FIGS. 18 and 19 is similar to the operation of the embodiments previously described, with certain differences described below.

Lifter-pusher bracket 220 is designed to push down punch pin 221 on the operating stroke as well as to lift said punch pin on the upstroke of handle 218. Said lifting operation is performed, as previously described, only in the event the punch pin sticks down in the die hole, in spite of the upward pressure of punch spring 228, which spring normally accomplishes the lifting of the punch pin 221 and the handle 218 without manual aid.

It should be noted that in the present embodiment, unlike in the forms previously described, when the handle is operatively depressed, lateral flange 227 of bracket 220 engages lower shoulder 224 of punch pin 221 and operatively depresses the punch pin through the full downstroke to perforate sheets inserted in the device. Preferably, in view of the added duty of the bracket 220, it is made substantially higher than lower shoulder 209 of punch pin 127, because shoulder 224 now becomes a working pressure surface adapted for pressure engagement by lateral flange 227.

Thus, lifter-pusher bracket 220 serves, in this modification, not only to push down the punch pin on the downstroke of the handle, but also to pull the punch pin upwardly if it strikes in its die hole. Operation of the invention is otherwise unchanged from that previously described. It should be noted that a gap such as gap 222, as shown in FIG. 15, is definitely required in the present modification, as it is necessary that lateral flange 227 be cut away opposite the neutral zone to assure that any head assembly in this zone will be inoperative as required. The short height of peripheral groove 222 in punch pin 221 makes it essential to remove lateral flange 227 opposite the neutral zone.

It is of importance to note that provision has been made to facilitate shifting the head assemblies in and out of neutral zones or to attach and detach said assemblies from the perforator, with full assurance that lateral flange 227 and groove 222 will always be aligned for cooperative functioning as described. Thus, in FIG. 18, spring 228 normally lifts retainer ring 229 until it abuts top wall 133 of the head 126. As the punch pin 221 normally rests on said retainer ring, the punch pin is always at the proper height to assure that groove 222 and lateral flange 227 are in proper alignment. This insures that no resistance will be met to shifting either in or out of the neutral zones, or to the attaching or detaching of a head assembly to the perforator. The slight end-play of the retaining ring 229 in groove 139 will not affect the alignment mentioned.

Figure 20:
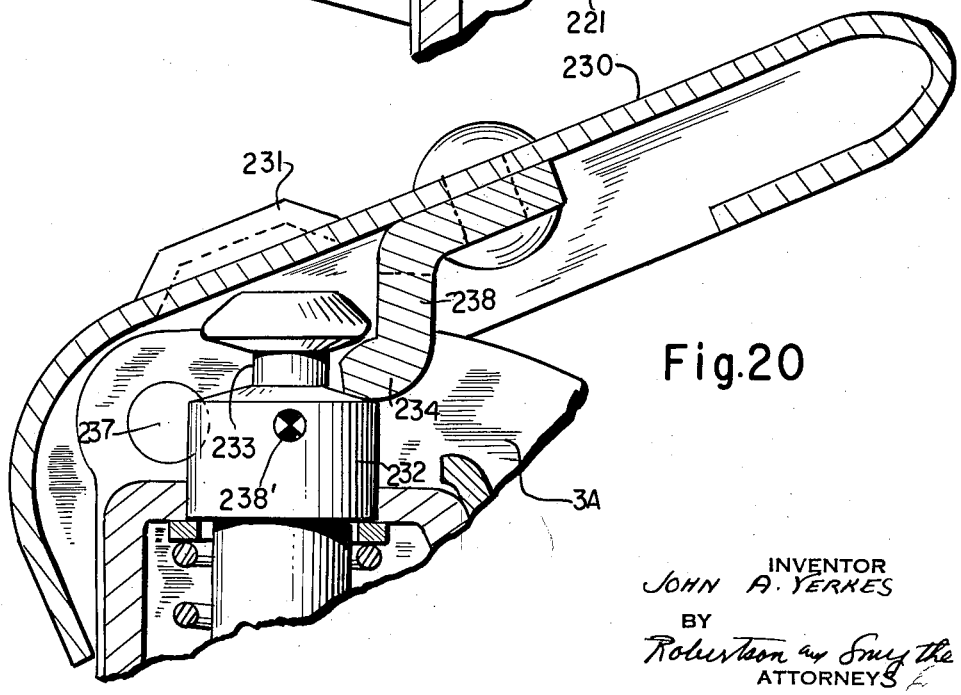

FIG. 20 shows a slightly modified form identical in principle and operation to that shown in FIGS. 18 and 19. Preferably used for heavy-duty perforating, a relatively heavy lifter-pusher bracket 238 is secured by riveting, or other suitable means, to handle 230 which is similar to handle 218 previously described, except that raised portion 231 is not spherical, as previously shown. Punch pin 232 is substantially enlarged at its upper portion, thus providing ample area for a substantially enlarged peripheral groove 233 adapted to accommodate a correspondingly large lateral flange 234 on the bracket 238. The upper and lower shoulders of groove 233 are preferably sloped as shown, and the mating surfaces on lateral flange 234 are preferably correspondingly sloped for smooth engagement and operation. The center 237 of the handle pivot is preferably located as shown in FIG. 20. It should be understood that this center may be moved laterally, to the right in the figure, a substantial distance as, for instance, to a point 238′ on the centerline of punch pin 232. By thus bringing the pivot center closer to lateral flange 234, great mechanical advantage may be obtained, especially if the handle is lengthened substantially. Since the handle 230 is pivoted, as previously described, on pivots on ears 2A and 3A of base 1A, and since preferably no shaft is used, there is no deterrent to locating the pivot center in any other advantageous position. Obviously, if an operating shaft were used, it could not possibly be located at point 238′ as described above since such shafts extend over the full width of the device from ear 2A to ear 3A, as is well known in the art.

Referring again to FIG. 21, it is apparent that the raised portion 231 may be dispensed with if the ceiling 230′ of handle 230 is high enough to achieve the results of neutral zones, and the cooperation between the flange 234 and the groove 233 may be employed to lower and raise the pin 232 if desired, thus eliminating the need for portions 140, 144 and 145, or their equivalents, of FIGS. 13 to 17, inclusive.

In a still further form, reference may be made to FIGS. 22 to 31, inclusive. Referring to FIG. 22, a base 301 of die-formed sheet metal or cast construction is provided with a pair of upstanding bearing members 302 and 303 secured to said base by means of rivets 304 or the like, or by integral casting with said base.

The base 301 is provided with portions forming return bends 305 (FIG. 23) to which are secured rubber feet such as grommets 306. A large rectangular opening 307 is formed in said base and extends across the same between said bearing members 302 and 303. Opening 307 terminates at its rear end in an angular bent-up portion forming a rail 308 which is firmly connected to said base by side webs 309 (FIG. 28) as well as at the rear. The opening 307 may be bounded at two of its sides by a depending apron 310, and at its front end by a depressed flat shelf 311 which is connected to the surface of said base by a sloping portion 312. The flat shelf 311 and sloping portion 312 are not sheared from the base 301 at their sides but remain connected through side portions 313 (FIG. 22) which join depending apron 310.

A scale 314 may be imprinted on the surface of base 301 for purposes which will be described later herein.

A depressed gauge way 315 (FIG. 22) may be formed in the base 301 and may terminate at its right end in a slot 316. A pair of similar slots 317 and 319 may be positioned at each end of a relatively short depressed way 318. The purpose of the ways and slots is to accommodate a slidable paper gauge 320 having an upturned flange 321 designed to center sheets of varying widths in a manner well known in the art. The gauge 320 is positioned above way 315, enters under the base surface through slot 316, emerges through slot 317, passes above way 318 and again enters under the base surface through slot 319.

Fitted over depressed way 315 is an arched spring 322 (FIG. 29) which is bowed sufficiently to normally force gauge 320 against the under surface 323 of base 301, thus frictionally preventing accidental displacement of said gauge 320 but permitting manual adjustment thereof. A more positive lock for said gauge may be used, and one will be described later herein.

To facilitate accurate adjustment of the gauge 320, it is graduated as shown in gauge-scale 324 which is necessarily half-scale as shown. An index line in the form of an arrowhead 325 is positioned at the center of the base 301 for reference to the graduations on said gauge scale 320. In addition to the lines and numerals on said scale, a number of spaced, circular indentations 326 have been provided as markers for certain widely used paper sizes when aligned with said index line 325.

Near depressed way 318 is a hole 328 in said base for the accommodation of a rivet 327 which serves to pivotally support a cam lever 329. The cammed portion 330 of the lever 329 is positioned underneath the base and the shank portion 331 extends through a port 332 preferably formed by depressing an area 333 in the base 301. A knurled, raised portion 334 of shank portion 331 enables manually swinging said cam lever 329. The cammed portion 330 of the lever 329 is positioned to engage and press against the edge of the gauge 320 through a port 334 preferably sheared in the base 301 as way 318 is depressed and formed therein.

In the position shown, there is no locking or braking pressure against the gauge 320, but as cam lever 329 is swung clockwise, lateral cam pressure will be exerted against the gauge 320 to bind it against the rear wall 336 of the way 318. By this means the gauge 320 may be releasably but positively locked in any selected position. Such a positive lock may be used separately or in conjunction with the friction means described above in connection with the friction means described above in connection with the arched spring 322. It should be understood that the present invention is not limited to the use of the above-described means to releasably hold the paper gauge against accidental displacement, but many other well-known means may be used. It should also be understood that I may here use double-geared gauges as disclosed in my prior Patents 2,524,582, 2,524,583 and 2,534,094 as well as the friction devices disclosed therein.

Depending aprons 310 are provided with beads 408 as shown in FIG. 28. A receptacle 409, for waste-paper cuttings, is provided with a pair of similar beads 410 formed on each of its resilient side walls 411. Said receptacle is so constructed that when it is desired to attach the same to base 301, a slight manual pressure upward on said receptacle will cause its resilient side walls 411 to spring apart slightly to permit them to pass over aprons 310 and to allow beads 410 of said receptacle to snap into resilient engagement with beads 408 on the aprons 310. The receptacle fits snugly against the underside of said base, as shown in FIGS. 23 and 28, and in no manner interferes with the operation or adjustment of the moving parts of the perforator. Longitudinally extending ribs 412 strengthen the receptacle and provide finger grooves to facilitate detachment from the base 301 for emptying.

Rotatably supported in upstanding bearing members 202 and 203 is pin actuating means or operating shaft 337 having a longitudinal groove 338 of the form best shown in FIG. 23. An operating handle 339 (FIG. 25) is keyed to shaft 337 by any suitable means such as a pin 340, as shown in FIGS. 25 and 26. Near its left end, the shaft 337 is provided with a peripheral groove 341 which is spaced so as to be normally positioned slightly to the left of bearing member 343. The peripheral groove 341 is adapted to receive a hook-like retaining key 342 that is revolubly mounted on a screw 343 threadedly secured to bearing member 303.

Hook-like key 342, when latched into peripheral groove 341 of operating shaft 337, performs the well-known function of a retaining ring cooperating with handle 339 to constrain shaft 337 against lateral shifting during normal punching operations. Screw 343 may be tightened so as to temporarily lock key 342 in the groove 341. The hook-like form and the pivoted mounting of key 342 enable easy and rapid disengagement so that shaft 337 may be longitudinally displaced when necessary for assembly purposes, as will be apparent later herein. It should be understood that the present invention is not limited to the above-described means for controlling longitudinal shifting of the shaft 337, since many other means well known in the art would suffice.

In the embodiment shown in the drawings, three head assemblies 345 are shown, but it should be understood that seven head assemblies or more may be used. The head assemblies may include a head 346 having a vertical bore 347 for the reception of a punch pin 348. The head 346 may be slotted to provide a paper space 349 adapted for the insertion of sheets which are to be perforated. The upper wall of said slot defines a stripper plate 350 which not only serves to strip the perforated sheets off punch pin 348 in the usual manner, but also acts to support a helical spring 351, the function of which is to return the punch pin 348 to its elevated position after the act of perforating has been performed, and the operating handle 339 has been released. It also restores the operating shaft 337 to normal position, as will be described later herein. It is to be understood, however, that if a punch pin 348 tends to stick so that the lifting force of said spring 351 is not adequate, the manually lifting of the operating handle 339 will rotate the operating shaft 337 in clockwise direction (FIG. 23), pulling the punch pin 348 free in the usual manner in perforators of this general type.

The lower portion of head 346 is bored as at 352 to permit passage of cuttings resulting from the perforating act. As shown, the hole 352 is merely a clearance hole substantially larger than the lower end 353 of punch pin 348, and the usual close-fitting die hole 354 is here provided in a hardened plate which is secured to the head 346 by means of a rivet 357. The rear end of the plate 355 is preferably fitted into a sloped notch 358 in the head 346 so that it is rightly keyed into position when rivet 357 is clinched.

The underside 359 of front tip 360 of the head 346 is preferably sloped to fit and rest upon sloping portion 312 of the base 301, and a substantial portion 361 of the bottom of the head rests squarely on the flat shelf 311 of base 301. A pair of arcuate ribs 362 serves to reinforce and strengthen the head 346.

Each head 346 is bored transversely at 363 (FIG. 23) for reception of operating shaft 337, the function of which will be fully described later herein.

Each of the heads 346 is provided with a transverse slot 364 which slidably fits over the rail 308 on the base 301. A set screw 365 is threadedly fitted into a tapped hole 366 in the head 346 and is positioned transversely to the slot 364 and the rail 308 so that the head assembly 345 may be locked in selected positions on the base 301 by tightening set screw 365 against rail 308, as clearly shown in FIG. 23. The head assembly 345 is supported on sloping portion 312, flat shelf 311, and rail 308 of the base 301, and on the operating shaft 337 which, in turn, is supported at each end by bearing members 302 and 303 on the base 301. It should be clear that if the set screw 365 is manually loosened, the head assemblies 345 may be freely shifted laterally along the shaft 337 to enable selective adjustment of the number and spacing of the holes to be perforated.

Referring to FIG. 27, a rear paper gauge assembly 367 is shown. It comprises a C-shaped frame 368 that is bored through its upper leg 372 as at hole 369, for slidable passage of a threaded portion 370 of a thumb-screw 371. Depending on two sides from the upper leg 372 are two aprons 373. Loosely but non-revolubly housed between the aprons is a nut 375 which is threadedly engaged with threaded portion 370 of the thumb-screw 371. The end 376 of the thumb-screw abuts against the top surface of base 301, thus pulling lower leg 377 of the frame 368 upwardly and tightly against the lower surface of the base 301 and rail 308 thereon. An L-shaped rear gauge member 382 has a bent-down portion which serves as a paper abutment 378 and a horizontal portion 379 which projects through a transverse slot 380 in frame 368. The portion 379 is provided with an elongated slot 381 which is freely slidable over threaded portion 370 of the thumb-screw 371. Thus, when the thumb-screw 371 is loosened, rear gauge member 382 may be shifted rearwardly or forwardly. As shown in the drawings, two spaced gauge assemblies 367 are preferably used for proper positioning of the paper.

As shown in FIG. 23, punch pin 348 is preferably formed with enlarged cylindrical portions 384, 385 and 386 closely fitted within vertical bore 347 of head 346. Lower end 353 of the punch pin 348 is substantially smaller than the enlarged portions, and of a size equal to that of the holes to be punched. It fits snugly but slidably in a hole 387 in stripper plate 350 of the head 346. An annular space 388 is thus provided for spring 351 which reacts at its lower end against the stripper plate 350 and at its upper end against shoulder 389 on punch pin 348.

The upper enlarged portion of the punch pin 348 is turned at portions 390 and 391 to provide clearance areas for the cylindrical portions of operating shaft 357 and to thus form an irregular bead or circular tooth 393. The tooth 393 is designed to mesh with longitudinal groove 338 in the operating shaft 337 in proper working relationship so that as shaft 337 is rotated counterclockwise (FIG. 23) by swinging handle 339 downwardly, punch pin 348 is forced downwardly, perforating whatever sheets may be positioned in space 349 in head 346. Proper clearance and pressure angles are provided on the tooth 393 and surfaces of slot 338 to assure efficient operation both in the downward as well as in the return stroke of handle 339. When operating handle 339 is released, spring 351 acts against shoulder 389 on the punch pin 348 and urges the latter upwardly. Circular tooth 393 on the punch pin 348 engages and revolves longitudinal groove 338 upwardly, restoring both shaft 339 and handle 337 to normal or upper position. It should be noted that with a helical spring used in the manner of spring 351, operating shaft 337 and its groove as well as operating handle 339 are driving members on the downstroke, but are driven members, normally, on the upstroke, at which time the punch pin 348 and its circular tooth 393 become the drivers.

The normal operation for the upstroke changes, however, if a punch pin 348 sticks in the die hole 354 as sometimes happens. At such times, the handle 339 is pulled upward manually since the spring 351 is inadequate, and, under these conditions, the handle 339, operating shaft 337 and its groove 338 are driving members on the upstroke.

The invention is not limited to the transmission arrangement described above. As is well known in the art, tooth 393 on punch pin 348 need not be circular in form, but may be of the side-milled type in common use in such devices, nor is the invention limited to the use of a longitudinally extending grooved operating shaft 337, as will be shown later herein.

It is understood that paper gauge 320 and its flange 321 have been previously adjusted to position the sheets as required, and that the paper gauge 320 may be locked in adjusted position by swinging cam lever 329 clockwise, as previously fully explained.

Briefly summarizing the operation of the parts described for FIGS. 22 to 31, inclusive, after positioning the paper gauge as described above, and placing the sheets to be punched in position, the head assemblies 345 are manually shifted to positions spaced with their index lines 394 indicating the desired hole spacing on scale 314 on base 301. Set screws 365 are then tightened, securing the head assemblies 345 to rail 308, against accidental displacement. Rear paper gauge assemblies 367 enable adjusting the distance from the hole centers to the proximate edge of the paper. Thumb-screws 371 are loosened, permitting adjustment of abutment surface 378 as shown by graduations 383 on gauge member 382, all as previously fully described. Pulling down operating handle 339 rotates operating shaft 337 counterclockwise (FIG. 23), and longitudinal groove 338 on shaft 337 engages and depresses punch pin 348 to perforate the sheets. Upon release of the handle 339, the parts are restored to their normal or upper positions by the action of spring 351 usually, but should the punch pin 348 stick in the die hole 354, a manual upward pull on the operating handle 339 will raise the pin 348 to its upper position.

As has been previously described, operating shaft 337 is provided with a longitudinal groove 338 which normally meshes with circular tooth 393 on punch pin 348. As shown in FIGS. 22, 23 and 25, portions 395 and 396 may be removed from the shaft 337, as by milling, leaving flat surfaces 397 and 398 which intersect the groove 338, as clearly shown in FIG. 23 in which the edge of surface 397 is indicated by a dotted line. Thus, the upper lip 403 of the groove 338 has been milled away. For reasons which will be apparent later, the areas described immediately above will hereinafter be referred to as neutral zones. Referring to FIGS. 22 and 23, neutral zones or inoperative areas may be located on each side of the central head assembly 345. It should be understood that the number and location of the neutral zones may be varied, the choice of locations being influenced toward areas not apt to be needed for punching known patterns of holes. As an illustration of a punch having more neutral zones, reference should be made to FIG. 31 in which bearing members 302′ and 303′ may be disposed farther apart than shown, for example, in FIG. 22, and operating shaft 337′ may be made longer so as to permit the use of new neutral zones at 399 and 400 at the extremities of the shaft 337′, in addition to neutral zones at 395′ and 396′. The additional zones 399 and 400 at the extremities of the shaft 337′ may be beyond the normal range of hole patterns. Thus, it is obvious that even more zones may be added at each end of the shaft 337′, by increasing the length of the latter.

Returning now to FIG. 22, scale 314 includes two arrowheads 401 and 402 located opposite the centers of the neutral zones 395 and 396, respectively. It will be clear that if a head assembly 345 is manually shifted so that its index line 394 indicates, for example, arrowhead 401, the head assembly will be accurately positioned in the neutral zone at milled surface 397. Similarly, a head assembly 345 may be positioned in alignment with the neutral zone at milled portion 398, or at any of the other neutral zones which may be provided as above described.

Heads 346 are preferably threaded at the upper ends of their bores 347 to form threads 404, into which are screwed cap screws 405, the lower ends of which constitute abutment surfaces 407 which are provided for the purpose of limiting the upward movement of punch pins 348. It should be understood that the present invention is not limited to the use of cap screw 405 for limiting the upward travel of the punch pins 348. It is obvious that an abutment may be provided in many well-known ways such as the use of many types of screwed, welded, pressed or riveted caps, diaphragms, bars or the like, preferably removable for facilitating replacement of worn or damaged internal head assembly elements. Furthermore, the invention is not limited to the use of an abutment for this purpose which is necessarily secured to head 346, as will be shown later herein. It will also be shown that by proper proportioning of the shaft and the punch pin 348, the upward travel of the punch pin 348 may be limited without the use of a separate abutment.

Assuming, for example, that there are three head assemblies 345, as shown in FIGS. 22 and 25, and it is desired to punch a two-hole pattern, simply shift one of the head assemblies 345 into one of the neutral zones, adjust the other two heads 346 to the desired pattern and depress the handle.

This exceedingly simple procedure is possible because the superfluous head assembly is rendered inoperative when positioned in the neutral zone, and there is no need to remove the assembly 345 from the perforator.

When one of the head assemblies 345 is shifted manually so that its index line 394 is aligned, set screw 365 may be tightened to releasably hold the assembly 345 in said position, or, alternatively, one of the other means to position and hold said head may be used.

Referring to FIG. 23, after the head assemblies 345 have been positioned securely as described, handle 339 is operatively depressed, and operating shaft 337 is thereby rotated counterclockwise (FIG. 23). In a punch assembly positioned at a neutral zone, punch pin 348 will not be depressed and will remain inoperative so long as the assembly remains at the neutral zone. As was previously explained, upper lip 403 of longitudinal groove 338 has been milled away in this area of the shaft, that is, when portion 395 was milled off to form flat surface 397. For this reason, shaft 337 may be operatively rotated through the full working stroke without pressing the punch pin downward and, thus, in effect, the punch pin 348 is rendered inoperative when positioned in a neutral zone and is unable to perforate sheets.

As FIG. 23 shows, regardless of whether the head assembly is in operative or inoperative position, the cooperative parts are always positioned correctly relative to each other. For this reason, a head assembly may be shifted in or out of neutral zones with no danger that the relation of the parts will change. For example, circular tooth 393 on punch pin 348 must always be in position to be actuated by the walls of groove 338 of shaft 337, unless the related head assembly is in a neutral zone. By limiting the upward movement of the punch pin 348 in its head, as previously described, the circular tooth 393 is always maintained in mesh with the groove 338, whether the groove is unbroken as in an operative zone, or whether upper lip 403 of the groove has been milled away, as in a neutral zone. It is, of course, contemplated that shifting of the heads 345 will be done when the handle 339 has been released and the parts are in normal or elevated position; indeed, shifting with the handle depressed could not be achieved.

In addition to limiting the upward travel of punch pin 348 to facilitate lateral shifting in and out of neutral zones, it should be noted that tooth 393 on punch pin 348 is preferably round, as shown in FIG. 23. While, as previously explained, one could use a side-milled tooth of the form commonly used on current punches of this type, it will be clear that with the round type it is never necessary to rotate the punch pin 348 in order to properly orient the tooth. The punch pin may freely rotate without affecting its proper meshed relationship with groove 338.

Obviously, also, with more neutral zones and more heads, a wider range of holes and hole patterns can be achieved without the need for removing any head assemblies. It should be understood, of course, that where a perforator is made with, for example, two neutral zones, as in FIGS. 22 and 25, for perforating patterns up to four holes, such perforators can, of course, accept additional head assemblies for punching seven-hole patterns, for example, but perforators with more neutral zones will obviously be more desirable.

Although the various features of the perforator have been shown and described in detail as applied to several embodiments of the invention, it is evident that changes in such details may be made and certain features may be used without others without departing from the principles of the invention.

What is claimed is:

1. In a perforator, a base having at least one substantially planar load bearing face, said base including means to slidably support and retain punch head assemblies thereon, a plurality of punch head assemblies slidably mounted on said support means and said base, a portion of each said assembly contacting said base in load bearing relation thereto, a punch pin in each said assembly, punch pin actuating means movably mounted on said base and having a portion thereof adapted to operatively engage said punch pins, said punch pin actuating means having operative and inoperative areas thereon, said operative areas including means to be engaged by selected ones of said punch pins when said actuating means is moved to operative position, said inoperative area including means so disposed on said punch pin actuating means that at least one of said pins may be disposed with respect thereto in such a position that said pin will be positioned out of operative contact with said punch pin actuating means, and means on said punch head assemblies to cooperate with the retaining means on said base for operatively retaining said punch head assemblies in adjusted positions with respect to said operative and inoperative areas on said punch pin actuating means.

2. The device of claim 1 wherein a punch head assembly is fixedly secured relative to said base and disposed relative to said inoperative area in such a position that its punch pin will normally be out of operative contact with said punch pin actuating means, said slidably mounted punch head assemblies being mounted on each side of said fixed punch head assembly and being laterally adjustably shiftable independently of each other, said punch pin actuating means including a movable depressor member for the punch pin of said fixed head assembly, said depressor member being movable between the punch pin of said fixed head assembly and the inoperative area of said punch pin actuating means to selectively render said fixed head assembly punch pin operative when said punch pin actuating means is moved to operative position.

3. The device of claim 1 wherein the means to slidably support and retain said adjustable punch head is arranged to guide the assemblies in a substantially straight path when the punch pin assemblies are manually shifted, and wherein said operative and inoperative areas are fixedly positioned and arranged on said punch pin actuating means in substantially straight alignment parallel to said path.

4. The device of claim 1 wherein said operative areas include means adapted to be engaged by selected ones of said punches, said means comprising at least one longitudinally extending pressure surface adapted to depress a multiplicity of selected punches simultaneously when said punch pin actuating means is moved to operative position, said surface being adjoined in longitudinal conformation by at least one inoperative area.

5. The device of claim 1 including resilient means for each punch pin normally acting thereon to automatically retract each of said punch pins after the pin has been operatively depressed by said punch pin actuating means, and means to limit the extent of said retraction so that upwardly projecting pins will not interfere with smooth manual shifting of said head assemblies where operative and inoperative areas adjoin.

6. The device of claim 1 in which said retaining means includes spring pressed detent means on each of said punch head assemblies cooperating with spaced indentations on said support base.

7. The device of claim 1 wherein said support means includes a longitudinally extending slot cooperating with said means on said punch head assemblies so that said assemblies can be moved laterally to said adjusted positions to produce preselected pattern and number of holes, a stripper plate and a die plate having a die hole therein for each of said punch head assemblies, and resilient means for each of said punch head assemblies normally retracting the punch pin thereof and moving said actuating means to inoperative position when released.

8. The device of claim 1 wherein there is at least one inoperative area adjacent an end of the pin actuating means.

9. The device of claim 1 including means on said punch pin actuating means for positively retracting punch pins which stick in depressed position after said pins have been operatively depressed.

10. The device of claim 1 including resilient means for said punch pin assemblies to normally retract punch pins thereof after said punch pins have been operatively depressed, and means on said punch pin actuating means for positively retracting punch pins which stick in operative position so tightly that said resilient means does not alone retract said punch pins.

11. The device of claim 10 in which said retracting means includes a longitudinally extending member having a surface adapted to engage with a mating surface on said punch pins, so that a plurality of punch pins will be simultaneously lifted when said punch pin actuating means is manually retracted.

12. The device of claim 1 including spring means acting on each punch pin to normally retract said punch pins after they have been operatively depressed by said actuating means, a shoulder on each of said punch pins, a longitudinally extending flange member on said actuating means engaging the shoulders on said punch pins to positively retract said punch pins if they stick in operative position after having been operatively depressed.

13. The device of claim 1 including spring means to normally retract said punch pins after they have been operatively depressed, shoulder means on each of said punch pins, a longitudinally extending flange member means extending only into said operative areas for engaging said shoulder means of operative punch pins to operatively depress said pins when said punch pin actuating means is moved to operative position and to positively retract said pins if they stick in operative position.

14. The device of claim 1 wherein said punch pin actuating means comprises an oscillatable shaft to which is secured an operating handle, said operative and inoperative areas being on said shaft.

15. The device of claim 14 wherein said shaft has an axially extending groove having an upper and lower wall, a tooth formed on each of said punch pins, said groove having walls intermeshing with the teeth of said punch pins, said means included in said operative areas comprising an upper wall of said groove adapted to engage the teeth on said punch pins to operatively depress said punch pins when said shaft is operatively turned, the lower wall of said groove being adapted to engage said teeth to positively retract said punch pins if said punch pins stick in operative position after being operatively depressed as said shaft is turned to inoperative position.

16. The device as specified in claim 15 wherein at least one inoperative area is located where a portion of said upper wall at said area is removed, so that a punch pin will not be operatively depressed when a punch pin assembly is located at said inoperative area and said shaft is operatively rotated.

17. The device of claim 16 wherein at least one of said inoperative areas of said shaft is located adjacent an end of the shaft and beyond the normal punching area.

18. The device of claim 16 wherein there are aligning means on said punch head assemblies limiting upward movement of the punch pin of each so that said teeth will remain in proper alignment with said groove when said punch head assemblies are disposed at said inoperative areas, whereby when said head punch head assemblies are shifted into an operative area, said teeth will smoothly mesh with said groove.

19. The device of claim 18 wherein the tooth on each of said punch pins is a circumferential tooth formed between two spaced apart circular flange portions on a punch pin.

No references cited.